United States Patent [19]

Colton et al.

[11] 3,928,726

[45] Dec. 23, 1975

[54] COMMON CONTROL VARIABLE SHIFT REFRAME CIRCUIT

[75] Inventors: John Robert Colton, Freehold; Robert Bruce Heick, Eatontown; Henry Mann, Holmdel, all of N.J.

[73] Assignee: Bell Telephone Laboratories, Incorporated, Murray Hill, N.J.

[22] Filed: Nov. 22, 1974

[21] Appl. No.: 526,107

[52] U.S. Cl. ........................ 179/15 BS; 178/69.5 R

[51] Int. Cl.² ........................................ H04J 3/06

[58] Field of Search ............ 178/69.5 R; 179/15 BS

[56] References Cited

UNITED STATES PATENTS

| | | | |
|---|---|---|---|
| 3,770,897 | 11/1973 | Haussmann | 179/15 BS |
| 3,772,600 | 11/1973 | Natali | 178/69.5 R |
| 3,881,065 | 3/1974 | Queffeulou | 179/15 BS |

OTHER PUBLICATIONS

*Bell System Technical Journal*, Vol. 51, Oct., 1972 pp. 1704–1708.

*Primary Examiner*—Ralph D. Blakeslee

*Attorney, Agent, or Firm*—John K. Mullarney

[57] ABSTRACT

The PCM encoded digital data groups transmitted to a switching office are respectively stored a frame at a time and then read out from store in the sequence such that a plurality of digital groups are multiplexed on to a common bus. The disclosed reframe circuit utilizes common control circuitry to carry out, in the same time frame, a reframing operation for any and all of the multiplexed digital groups which are out-of-frame. An "old" data store is used to store a given number of selected data bits, of each group, for two frames for framing comparison purposes. A reframe comparator serves to compare, for each group, the output of the old data store with new data that is two frames later in time. A suitability store is used to record, for each group, which of the compared data bits have had framing pattern violations. A shift decoder determines how many digit shifts, if any, should be made by the reframer, based on the present set of comparisons and past suitabilities, in order to move to the next candidate for the framing bit. Once the number of shifts is determined, the old data store, the suitability store and the write address logic of the receive data store for the out-of-frame digital group(s) are shifted by the determined number of digit shifts in preparation for the next set of data bit comparisons. The described operation is then repeated until the framing bit is recaptured.

16 Claims, 21 Drawing Figures

MEMORY CELL

COMMON CONTROL VARIABLE SHIFT REFRAME CIRCUIT

BACKGROUND OF THE INVENTION

This invention relates to a reframe circuit which serves to maintain each of a plurality of digital groups of time division multiplexed channels in frame synchronization, that is, in an "in-frame" condition.

It is a commonplace in digital transmission to incorporate a marker pulse (i.e., framing bit) in a preassigned position in a digital data bit stream for the purpose of maintaining the receiving apparatus in a synchronous relationship to the transmitting apparatus. Such synchronization is essential for correct reconstitution of a message and, in the case of a time division multiplex system, for correct distribution of the several messages to their intended subscribers. To this end, a digital transmission system invariably includes frame detection circuitry for monitoring and determining the in-frame or out-of-frame condition of a received digital data bit stream; and, when the digital bit stream goes out-of-frame (i.e., loss of synchronization) vis-a-vis a locally generated framing pattern, a reframe circuit goes through a reframing operation to recapture frame synchronization. This is standard operating procedure in the digital transmission field.

In the past, pulse code modulation (PCM) digital data terminals have performed the task of frame synchronization, as well as signaling extraction, etc., on a per "digroup" basis — a digroup or digital group comprising a plurality of time division multiplexed PCM messages and multiplexed framing and signaling bits; see the article "The D3 Channel Bank" by W. B. Gaunt and J. B. Evans, Jr., *Bell Laboratories Record*, August 1972, pages 229–233, and the references cited therein. The per digroup partitioning of these functions has heretofore resulted in efficient terminal design.

With increasing digital traffic, it is not uncommon now to find proposals for multiplexing a plurality of digroups for transmission to a remote location over a common transmission facility or alternatively for multiplexing a plurality of received digroups on to a common bus at a switching center. These two cases are somewhat analogous and present the same problem with regard to reframing. Conventional practice would suggest carrying out the reframing operation on a per digroup basis using plural reframers to respectively maintain each of the plurality of multiplexed digroups in frame synchronization. The obvious disadvantage of this approach is, of course, its complexity and redundancy in reframe circuitry.

The U.S. Pat. No. 3,770,897 to R. H. Haussmann et al., issued Nov. 6, 1973, appears to suggest carrying out the frame synchronization operation for a plurality of multiplexed digital groups on a shared basis, but this proposal is really a hybrid of the per digroup approach noted above. The system of the patent functions as a sequential machine that monitors and reframes the multiplexed groups in a mutually exclusive fashion. That is, each digital group is separately dealt with over a number of frames to determine the in-frame or out-of-frame status of the same and to achieve frame synchronization if an out-of-frame condition exists. But while a given group is being so handled, the other digital groups are ignored.

Accordingly, the primary object of the present invention is to continually maintain each of a plurality of time division multiplexed digital data groups in frame synchronization.

A related object of the invention is to carry out a reframe operation, in the same time frame, for any and all of a plurality of time division multiplexed digital groups.

A further object is to continually monitor and maintain frame synchronization for all of a plurality of time division multiplexed digital groups during the very same time frame of a switching office, yet treating each group independently.

SUMMARY OF THE INVENTION

The reframing circuit of the invention can be advantageously utilized, by way of example, in a large scale, time division switching machine such as the Bell System's No. 4 ESS. The plurality of PCM encoded digital data groups transmitted to a No. 4 ESS office are respectively stored a frame at a time and then read out from store in a sequence such that a plurality (5) of $n$-channel ($n = 24$) digital groups are multiplexed onto a common bus.

The variable shift, reframe circuit of the present invention utilizes common control circuitry to carry out a reframing operation for any and all of multiplexed digroups (including a virtual digroup of test time slots) which are out-of-frame. An "old" data store including a shared recirculating memory is used to store successively a given number of selected data bits (including the assumed framing bit) of each digroup for framing comparison purposes. A reframe comparator serves to compare, for each digroup, the data output of the old data store with new data that is one or more frames later in time (e.g., two frames). A suitability store including a shared recirculating memory is used to record, for each digroup, which of the compared data bits have had framing pattern violations and which appear as suitable candidates for the framing bit. A shift decoder determines how many digit shifts, if any, should be made by the variable shift reframe circuit, based on the present set of comparisons and past suitabilities, in order to move to the next candidate for the framing bit. Once a given number of shifts has been determined, the old data store, the suitability store and the write address logic of the receive data stores for the out-of-frame digroup(s) are shifted by the determined number of shifts in preparation for the next set of data bit comparisons. The described operation is then repeated until the framing bit is recaptured.

In accordance with a feature of the invention, compensation logic is utilized for the purpose of compensating the reframe circuit for framing pattern changes introduced into each of the multiplexed digroups by the switching machine for synchronization purposes.

An advantageous feature of the invention is the facility with which maintenance testing can be carried out. By the use of test time slots, the common control circuitry that is shared by all digroups can be continually tested, while in service, and failures can thus be quickly detected.

A still further feature of the invention is that the common control approach leads to a substantial savings in circuit complexity, and the circuitry is more easily adapted to integrated circuit design.

BRIEF DESCRIPTION OF THE DRAWINGS

The invention will be more fully appreciated from the following detailed description when the same is considered in connection with the accompanying drawings in which.

DETAILED DESCRIPTION

Figures 1, 4:
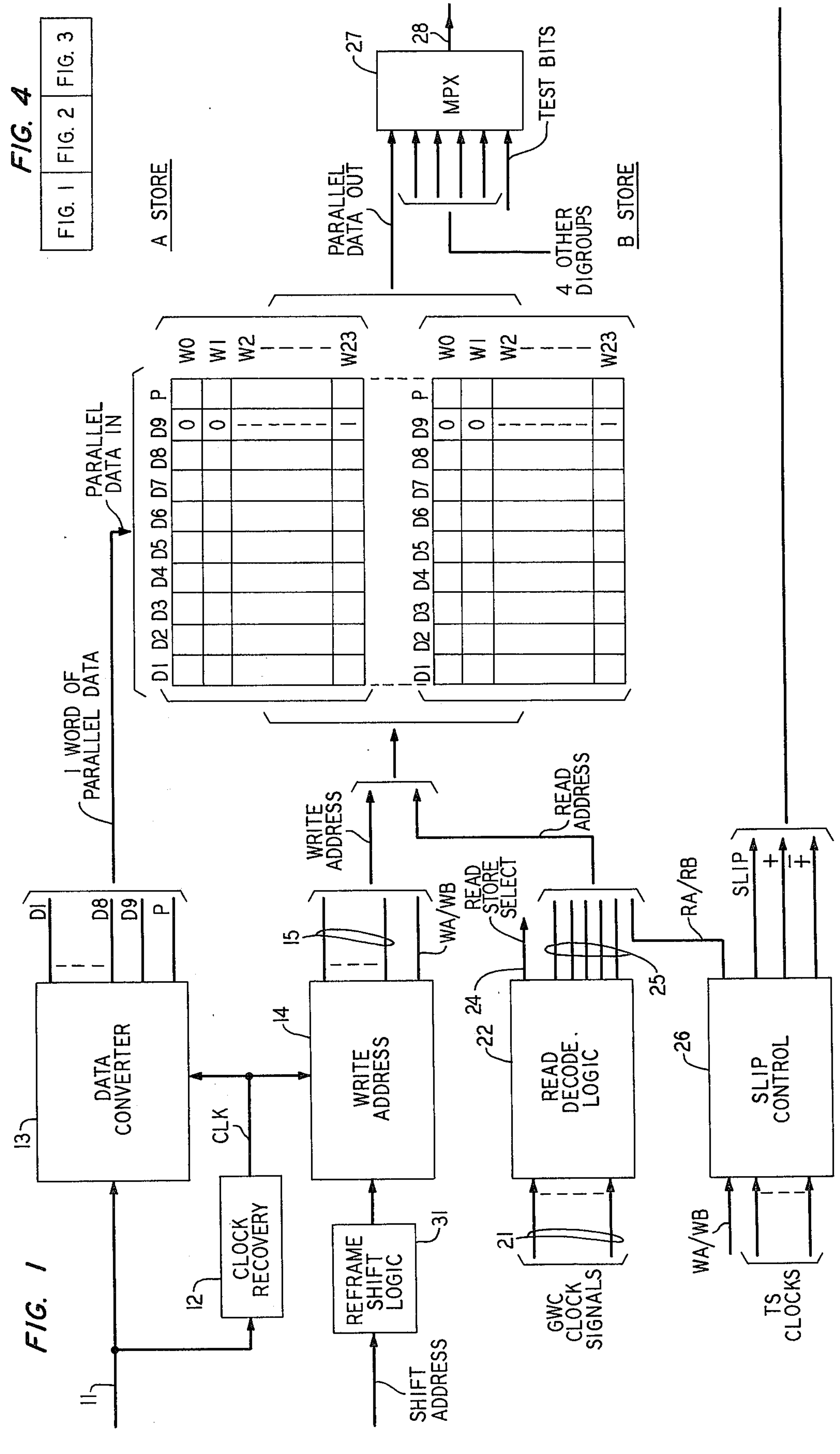
FIGS. 1 through 3, when arranged as shown in FIG. 4, show a simplified schematic block diagram of a portion of a time division switching machine incorporating the apparatus of the present invention.
Figure 2:
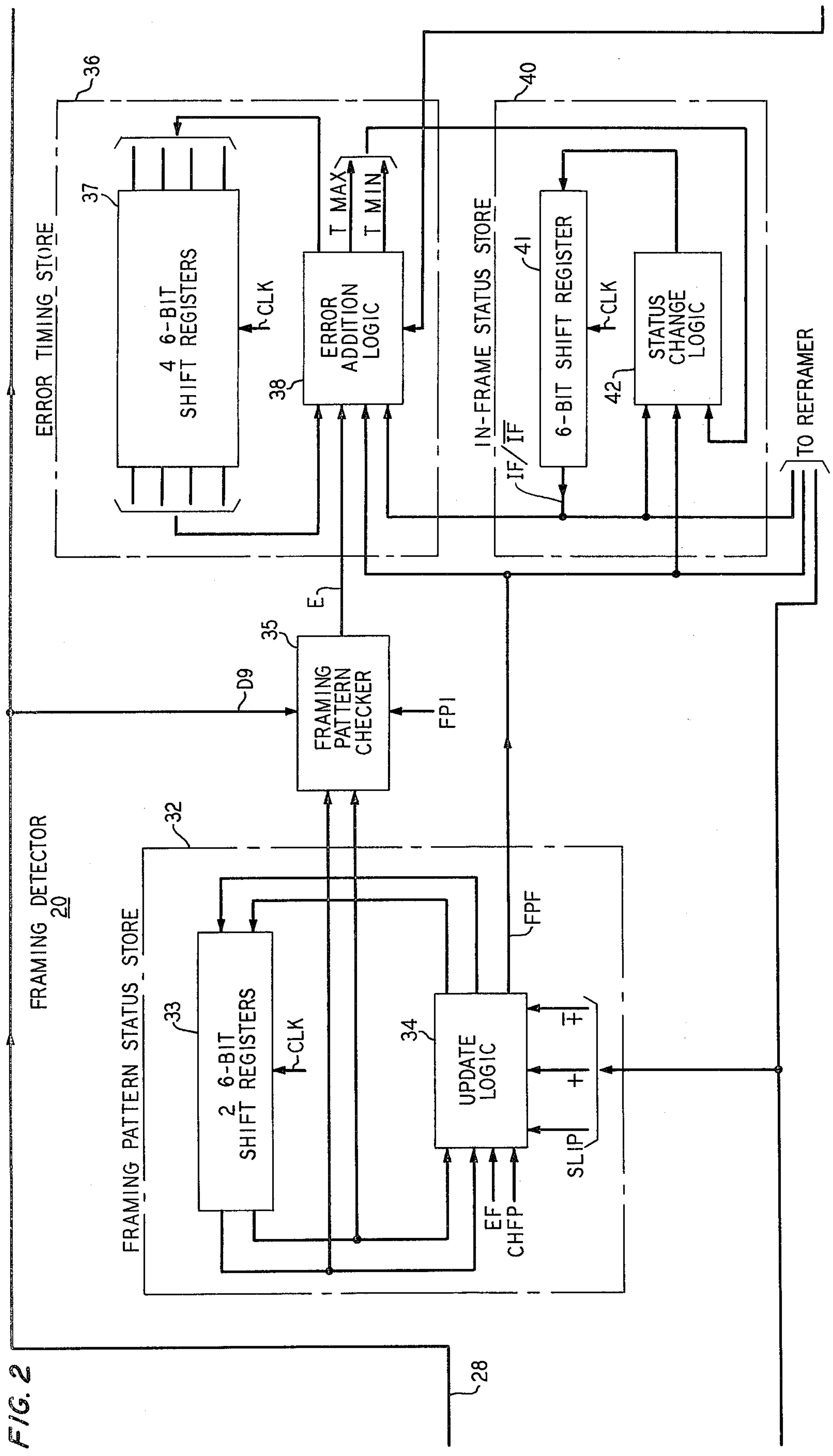
Figure 3:
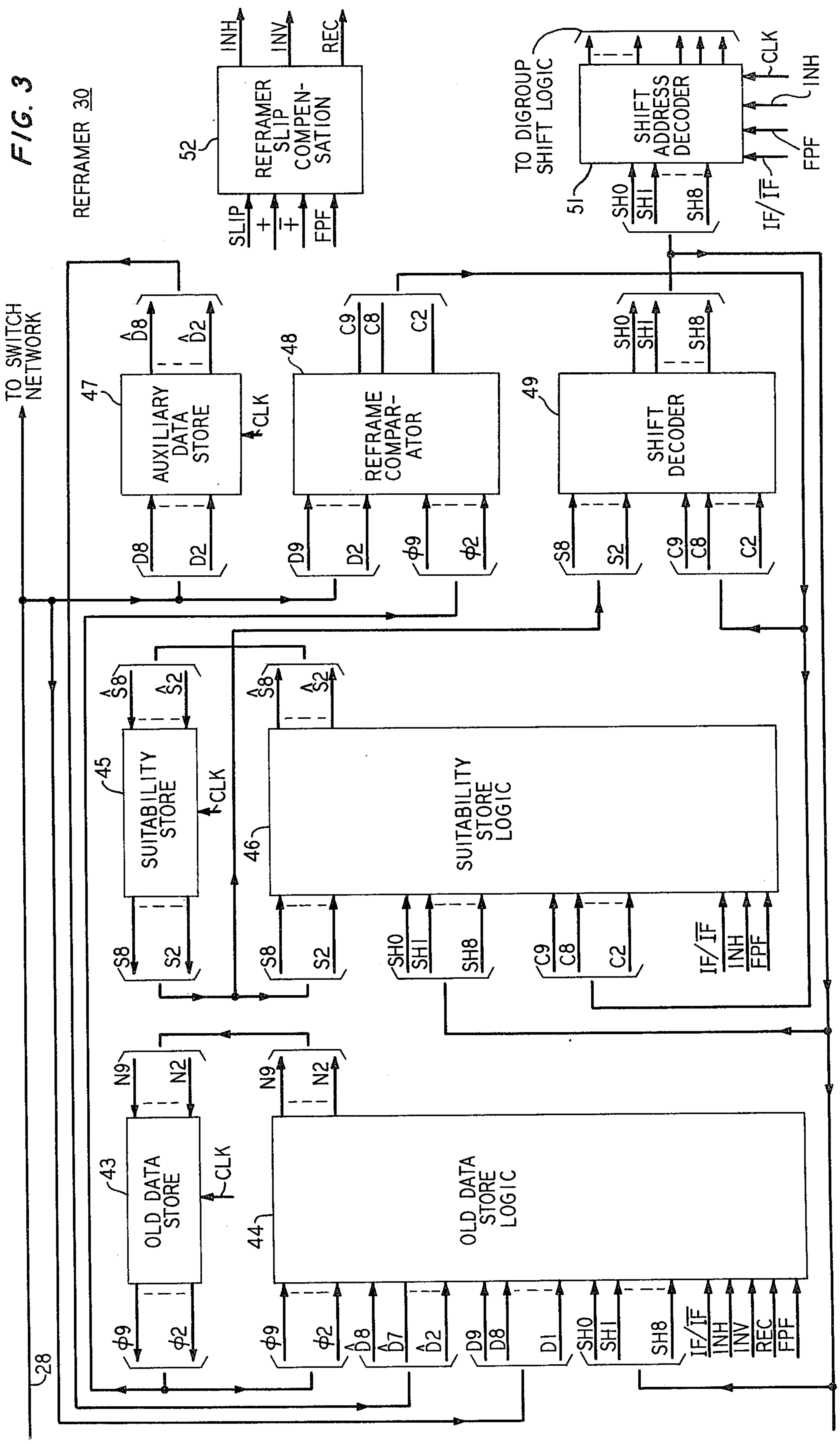

Turning now to FIGS. 1–3 of the drawings, there is shown part of a time division switching system that incorporates a reframe circuit in accordance with the invention. For purposes of illustration, the system of FIGS. 1–3 embodies many of the features and aspects of the No. 4 ESS; see the article "No. 4 ESS — Long Distance Switching for the Future" by G. D. Johnson, *Bell Laboratories Record*, September 1973, pages 226–232. It is to be understood, however, that the switching system itself constitutes no part of the present invention and it will be obvious to those in the art that the invention concepts here disclosed can be used with other and different time division switching systems. And, as heretofore suggested, the present invention can also find use in the analogous situation wherein a plurality of digroups are multiplexed together for transmission to a remote location over a common transmission facility. The incoming transmission line 11 carries a digital group (digroup) of separate and distinct messages in a typical time division multiplexed fashion. Again for purposes of illustration, the data transmitted over line 11 can be assumed to have a format similar to the data format transmitted to a No. 4 ESS office over a Tl transmission line (see, for example, the article "The D3 Channel Bank" by W. B. Gaunt et al., *Bell Laboratories Record*, August 1972, pp. 229–233). This data format is shown in an abbreviated form, in the expanded view of digroup 2, in FIG. 5 of the drawings. The format consists of 24 8-bit words and one framing bit for a total of 193 bits per frame. The 24 words typically represent 24 separate and distinct messages deposited in 24 separate and distinct channels 0–23. The words are PCM (pulse code modulation) encoded and the least significant bit (i.e., eighth bit) of a channel is periodically dedicated for signaling purposes. This dedication is discussed in detail in the article by Gaunt et al., supra, but it is of no consequence in the consideration of the present invention. The PCM encoded data words can represent encoded voice or video information, digital data from a data set, etc. For present purposes it is convenient to consider the 193rd data bit (i.e., the framing bit) as a part of the last word (W23) of a frame. As suggested in FIG. 5, and as will be described in detail hereinafter, five digroups of 24 channels each are multiplexed on to a 128 time-slot bus. Of these 128 time-slots or channels, 120 time-slots are utilized for traffic (5 × 24 = 120) and eight are spares that may be used for maintenance testing and the like.

The received digroup is delivered to the clock recovery circuit 12 and to the data converter 13. The circuit 12 recovers the line timing of the incoming Tl line 11 and serves to generate coincident clock pulses at the incoming line rate (1.544 MHz). These clock pulses are delivered to the data converter 13 and to the write address circuitry 14. The data converter 13 serves to regenerate the received digital bits, degraded in transmission, and it further converts the same from a bipolar to a unipolar format. The data converter 13 also serves to convert each of the successive digital words (WO–W23) to a parallel bit format. All of the data words except the last (W23) are 8-bit words and hence the D9 bit, on the similarly designated output lead of converter 13, is normally a logical or binary 0. The 193rd or framing bit (D9 bit) is considered part of the last word (W23) and hence with the occurrence of word W23 this D9 bit may be a binary 1 or 0 in accordance with the framing pattern. The D9 bit is written into the store along with the data bits D1–D8 of data word W23.

The data converter 13 also includes a conventional parity generator (not shown) which counts the number of binary 1 bits, for example, in a data word and adds a parity bit P, where appropriate, for "odd" parity check purposes. The parity check itself is carried out at a later stage in the switching operation and therefore can be disregarded for present purposes.

The output clock pulses of clock recovery 12 are serially delivered to the write address circuit 14 which comprises digit and word counters. The word counter of circuit 14 counts through 24 words and then recycles. Assuming an in-frame situation, this word counter will count from 0 through 23 in time coincidence with the appearance of data words W0 through W23 at the output of the data converter 13. Thus, the word counter indicates the "address" (e.g., the position in the frame) of each data word. In accordance with binary notation, at least five binary digits are required to indicate a count of 24. It is these five bits on the output leads 15 that are used to write the data words in the appropriate positions in the data stores.

The data stores A and B are each organized as a 24 word by 10 bits per word random access memory. When the digroup is in frame, the A and B receive data stores each store a complete frame of data including the framing bit, plus a parity bit for each channel of the frame. As symbolically shown in FIG. 1, the data words W0–W23 are stored in successive rows of each store along with a D9 bit (which is always a binary 0 for all but the last word) and a parity bit (P). Successive frames of incoming data are alternately written into the A and B stores.

Each receive data store comprises a static MOS (metal oxide semiconductor) store with random access memory and conventional address decoding logic. In practice, the A and B storage matrices would simply comprise separate and distinct portions of a larger storage matrix. Data stores are, of course, well known in the art and a number of prior art storage arrangements might be advantageously utilized herein.

As previously indicated, the successive frames of incoming data are alternately written into the A and B stores. The 5-bit write address information on leads 15 serves to designate the storage location or row for the parallel data word output from the data converter 13. And, successive data words are written into successive storage locations as the 5-bit write address successively increments from 0 through 23.

The WA/WB (write A/write B) output of the write address circuit 14 on a frame basis alternately enables and thereby selects the data store (A or B) into which the 24 words of each frame are written. Thus, as the WA/WB waveform successively alternates, the successive incoming digroup frames are alternately written into the A and B stores.

Figure 5:
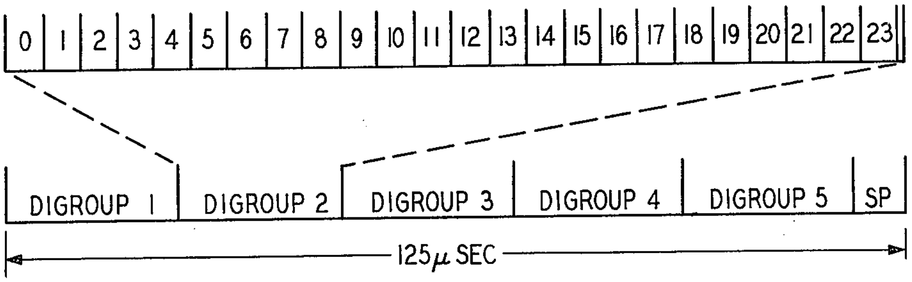
FIG. 5 illustrates the data format of a typical incoming multiplex line.

The line transmission rate is given as 1.544 MHz, there are 193 bits per frame, and the duration of each line frame is 125 microseconds, which is subdivided into channels of 5.18 microseconds each. This frame duration, in turn, establishes the internal frame duration of the switching office at a corresponding 125 microseconds. The office 125 microsecond frame is divided into 128 time periods, referred to hereinafter as time-slots or channels. Five digroups of 24 channels each are multiplexed on to a 128 time-slot bus, in the manner to be described, leaving eight spare time-slots. These spare time slots are used for maintenance test purposes, e.g., the last of the spare time slots is used to test the common control reframer while the same is in service operation on working digroups. Each write cycle or write operation requires an entire frame (125 microseconds). However, since five digroups are multiplexed onto a common bus in the same time duration (125 microseconds), as illustrated in FIG. 5, the time required to read all 24 words of a given digroup is only about 20 percent of the time used to write those words.

Returning again to FIGS. 1–3, the read cycle will now be described. Amongst other timing signals, the system, or office, clock (not shown) generates GWC (generated word code) clock signals that serve to define the 128 time-slots of the office frame. These GWC clock signals are delivered over seven leads 21 ($2^7 = 128$) to the read decode logic 22. The logic circuitry 22 decodes these clock signals in a manner such that the five output leads 25 increment through a count of 0 through 23 for five successive cycles; in binary notation, at least five binary digits are required for a count of 24. It is this count or 5-bit address information on leads 25 that is used to read the data words from the respective locations in all of the data stores. After five successive count cycles of 0–23 are registered on leads 25, the operation is interrupted for a period of eight time-slots (i.e., time-slots 120–127 which are spares) and then it repeats. The "read store select" lead 24 is energized for a predetermined one of the five cycles and it serves to enable the data read out of the particular digroup associated with stores A and B. There are four other "read store select" leads (not shown) and each is respectively energized during a given one of the five cycles to enable the read out of a given digroup.

The slip control circuit 26 generates an output signal RA/RB (read A/read B) which serves to alternately enable the read out from stores A and B; this output signal thus comprises part of the read address information for stores A and B. The RA/RB output waveform of slip control 26 is such that data is typically read out of stores A and B in an alternate fashion and read out is generally phase shifted with respect to write in such that the read out of one store occurs simultaneously with the write in to the other. However, when the read cycle effectively drifts or slips to a predetermined extent in either direction relative to the write cycle, the slip control 26 operates on the read cycle to discard a frame of data or to double-read a frame of data, depending on the relative direction of drift between the read and write cycles. It should be evident from the foregoing description that the decode logic 22 is common to all five digroups that are multiplexed together, but a slip control circuit 26 must be provided on a per digroup basis.

The recovered line timing used to write the data stores for a given line may not be synchronized to the office timing used to read these stores and consequently more or less information can be written into the stores than is read out of them. The slip control circuit 26 deals with this problem by either discarding a frame of data or double-reading a frame of data, depending upon the relative drift between the read and write cycles. More specifically, if the recovered line frequency used to write the data stores is greater than the office frequency used to read these stores, the read waveform RA/RB will move or slip in a given direction relative to the write waveform WA/WB. This condition is designated as negative slip. After a predetermined amount of negative slip is experienced, the slip control 26 operates on the read cycle to cause a deletion of a frame of data (i.e., a frame of data in store B is discarded). Thereafter, the A and B stores are once again read in a continuous alternating fashion.

Alternatively, of course, the recovered line frequency may be somewhat less than the office frequency and hence the read waveform will move or slip in the opposite direction relative to the write waveform. This condition is designated as positive slip. After a predetermined amount of positive slip is experienced, the slip control operates on the read cycled to cause a double-reading of a given frame of data (i.e., a frame of data in store A is repeated). Thereafter, the A and B stores are once again read in a continuous alternating fashion.

The determination of this slip or drift, as well as the direction thereof, is accomplished by comparing the write cycle (WA/WB) for the digroup with predetermined time slot clock signals (e.g., TS00, TS05 and TS18) of the read cycle, which are derived from the read logic circuit 22. A slip operation is indicated by a signal on the slip output lead of circuit 26, and a positive slip (+) or negative slip (±) output signal indicates whether a frame has been repeated or deleted.

The described slip operation achieves synchronization at a switching office, in an essentially asynchronous communication network, with a minimal of resultant impairment to the transmitted signals. A frame of multiplexed data comprises a plurality of distinct message words in distinct multiplexed channels of the frame and therefore one lost or duplicated digital word per message is not significant. Also, the frequency of a frame deletion or double-reading is small and it is always exactly one frame of data that is affected.

As the five "read store select" leads (e.g., lead 24) of decoder 22 are successively energized the data stores of five digroups are read in succession and the digroups multiplexed together in multiplexer 27 to form a multiplexed bit stream as depicted in FIG. 5. Thus, the 24 channels of digroup 1 are read, then the 24 channels of digroup 2, and so on for the other three digroups. The eight spare time slots (SP) separate the data from channel 23 of digroup 5 and channel 0 of digroup 1. The data words are read out of the store in a parallel format and they remain in a parallel format on the common bus 28.

With the exception of the slip control circuit 26, the individual circuits recited above and shown in block form in FIG. 1 of the drawings are considered to be known to the art and amply described in the literature. The slip control circuit is disclosed in detail in the copending application of J. R. Colton and H. Mann, Ser. No. 427,068, filed Dec. 21, 1973.

The time division multiplexed digital data groups are delivered to a switching network (not shown) over the common multiplex bus 28. The framing detector 20 continually and independently monitors, at the multiplex point, all of the digroups (and the virtual digroup of test time slots) on a time multiplexed basis. The framing detector 20 examines each digroup for frame synchronization by comparing the framing bits thereof against a locally generated framing pattern. If the comparison is successful, the digroup is in-frame and no corrective action need be taken, If the comparison fails, however, an out-of-frame condition is indicated and a "hunting" procedure is initiated by sending an appropriate signal to the reframer 30. In response, a "shift address" signal is developed and sent from the reframer 30 to the reframe shift logic 31, of FIG. 1, for the purpose of altering the counting operation of the write address circuit 14, e.g., by advancing the count a given amount. The hunting operation continues, and the count of circuit 14 is intermittently changed, until an in-frame condition is once again realized, i.e., the digroup framing bits on the bus 28 are once again successfully compared with the locally generated framing pattern.

The framing detector 20 is disclosed in detail in the copending application of J. R. Colton, R. B. Heick and H. Mann, Ser. No. 484,414, filed July 1, 1974. Accordingly, for circuit details and for a complete explanation of the operation of the framing detector, reference should be had to this copending application. However, since the frame detector 20 interacts with the reframer circuit of the invention, some particulars as to the operation of the framing detector are deemed necessary to provide a thorough understanding of the present invention.

Turning thus to the framing detector 20, the framing pattern status of each multiplexed digroup is stored in a shared recirculating memory, which is continually updated in accordance with changes introduced into each digroup signal by the switching machine for synchronization (i.e., + or ± SLIP) and reframe purposes. This operation is carried out by the framing pattern status store 32 which is comprised of a pair of 6-bit shift registers 33, that provide the requisite memory, and the update logic 34, which updates or alters the stored status information of each digroup, as required. The framing pattern checker 35 serves to compare the stored framing pattern status of each digroup with the digroup framing bits (D9) as each digroup appears on the multiplex bus 28. If this comparison fails, an error signal (E) is generated. A shared, error timing store 36 linearly counts the error signals for each digroup and when the error count of a given group reaches or exceeds a predetermined threshold (E = 15) an out-of-frame indication is generated. The error timing store 36 comprises four 6-bit shift registers 37 and the error addition logic 38. Four bits are required to register an error count of up to 15 and hence the need for four, parallel shift registers. The error addition logic 38 serves to up-count, or down-count, the stored error count for each digroup. The in-frame status store 40 maintains a real-time record of the in-frame, or out-of-frame, status for each digroup (and the virtual digroup of test time slots). The real-time record is stored in the 6-bit shift register 41. If a particular digroup is in frame its frame status store signal remains in-frame (IF) until the error timing store 36 reaches the error count threshold; at that time, the status change logic 42 responds to a signal from the error timing store 36 to change the stored status for the digroup to IF. After framing has been recaptured in the manner to be described, the error timing store 36 sends an appropriate signal to the logic circuit 42 to change the stored status of the digroup back to IF. A framing pulse frame (FPF) indication from the framing pattern status store 32 and the IF/IF status signal from the in-frame status store 40 are coupled to the reframer 30 in the manner and for the purposes to be described in detail hereinafter.

The incoming Tl transmission lines, such as line 11, transmit framing information in the 193rd pulse position of every other frame. Thus, the framing pattern which results is as follows:

----1----X----0----X----1----X----0----

The alternating 1 and 0 bits are, of course, the valid framing bits. The frames which do not contain valid framing bits are called signaling subframes and the 193rd bits of these frames are used to send signaling information, which for present purposes can be disregarded. In a period of four frames the framing pattern of an in-frame digroup may be disposed in any one of four ways, namely:

0--X--1--X--
X--0--X--1--
1--X--0--X--
X--1--X--0--

It will be evident, therefore, that two, state variables (i.e., two binary data bits) can be used to define the state of the framing pattern for each in-frame digroup (and the test digroup). The following table summarizes the four possible states of a digroup's framing pattern in terms of these two, state variables:

| State | State Variables |
|---|---|
| 0 | 00 |
| 1 | 01 |
| 2 | 10 |
| 3 | 11 |

At any given point in time, the framing pattern status of a given digroup may be in any one of the four tabulated states. And the respective states of the multiplexed digroups (and test digroup) are completely random. That is, any digroup can be in any state without regard to the framing pattern states of the other multiplexed digroups.

The two state variables (i.e., two binary digits), that define the framing pattern status for each of the digroups (and test digroup), are stored in the pair of 6-bit shift registers 33 of FIG. 2. To store the framing pattern status for all five digroups and the test digroup (which is treated as a digroup of eight time slots) a pair of registers of 6-bit length are required. At any point in time, the corresponding cells of the pair of registers 33 will temporarily store the two state variables (each variable being either a binary 1 or 0) for a given digroup. The registers 33 are shifted by clock (CLK) signals derived from the office clock and which shift the stored data at the beginning of time slots 0, 24, 48, 72, 96 and 120. Thus, for example, at the beginning of time slot 0 of the office cycle or frame, the binary coded framing state of digroup 1 will appear at the output of the shift registers 33 and the stored states of the other digroups will be advanced one cell position toward the output. The binary coded state of digroup 1 is then updated by the logic circuit 34, if required and in the manner described in the copending application of Colton-Heick-Mann, supra, and then returned to the input of the registers 33 where it is subsequently advanced or shifted once again toward the register output. At the beginning of time slot 24 of the office cycle, the binary coded framing state of digroup 2 will be shifted to the output of the shift registers 33 from where it is coupled to the update logic 34. Concurrently therewith, the stored states of the other digroups are each advanced in the registers 33 one cell position. In this fashion, the two state variables for all the digroups, including the test digroup, will be continually advanced through the shift registers 33 and then fed back to the input stages thereof via the update logic 34.

Figure 6:
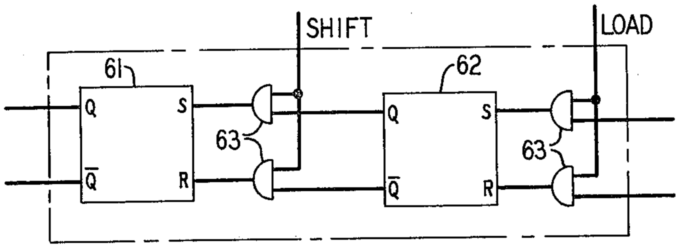
FIG. 6 is a schematic diagram of a single memory cell of which all of the 6-bit shift registers, shown in the drawings, are comprised.

The shift registers 33, as well as the shift registers 37 and 41 of the framing detector 20, are each comprised of six tandem-coupled memory cells, with each cell configured as shown in FIG. 6. A typical memory cell consists of a pair of tandem-coupled flip-flops 61 and 62 and the clock gate logic 63. A binary data bit (i.e., a state variable) is read into the input flip-flop 62 during each of the last, digroup time slots and the data is shifted from flip-flop 62 to the output flip-flop 61 during each of the first, digroup time slots. Thus, the shift occurs during time slots 0, 24, 48, 72, 96 and 120 of the office cycle, while the read in or "load" for each cell occurs during the preceding time-slots 127, 23, 47, 71, 95 and 119 of the office cycle. The framing pattern status of each digroup is therefore clocked out of the registers 33 during the first time slot of a digroup (e.g., TSO), revised if necessary in the update logic 34, and then loaded into the input cells of the registers 33 during the last digroup time slot (e.g., TS23). The framing pattern state of all of the digroups are thus continually recycled in status store 32, and periodically updated or altered as required.

The clocking of the shift registers 33 and the cell configuration of the same have been set forth in detail above because the shift registers utilized in the old data store 43 and in the suitability store 45 of the reframer circuit 30 are clocked and configured in exactly the same way.

The update logic 34 is shown in detail in the above-cited, copending application of Colton, Heick and Mann. As explained heretofore, the slip control 26 of FIG. 1 may operate to discard a frame of data or to double-read a frame of data and will therefore introduce changes in the framing pattern of a digroup. Such a change must, of course, be accounted for in the framing pattern status information that is stored in circuit 32. Also, after a reframe operation the framing pattern of a digroup may differ from the pattern before reframing was initiated and, here again, the same must be accounted for in the stored, framing pattern status information. A CHFP (change framing pattern) signal is generated by the reframe circuit 30 if it is necessary to change the framing pattern state stored in status store 32; the development of this latter signal will be covered in detail hereinafter. The update logic 34 thus serves to change the state variable(s), stored in the framing pattern status stored 32, in accordance with the input SLIP and/or CHFP signals. In the absence of slip or a signal to change the framing pattern (CHFP) from the reframe circuit 30, the stored digroup status remains the same.

A framing pulse frame (FPF) signal is generated by the logic circuit 34 and it serves to distinguish those frames of a digroup which include framing bits from those frames (i.e., signaling subframes) which do not. An FPF signal is generated for each digroup as the framing pulse frame of the digroup appears on the multiplex bus 28.

The binary coded, two state variable, output signal of shift registers 33 is delivered to the framing pattern checker circuit 35, which serves to compare the state variable signal for each digroup with the D9 framing bits of the digroup as the latter appear on the multiplex bus 28. This comparison function is carried out by means of an exclusive-OR circuit. If the comparison fails (indicative of a possible out-of-frame condition), an error signal (E) is generated; otherwise, E = 0 during a framing pulse frame (FPF). As will be more evident hereinafter, only those error (E) signals that are generated during a framing pulse frame are taken into account.

The two state variable signal for a given digroup is substantially coextensive in time with a frame of the digroup as the same appears on the multiplex bus 28. Accordingly, at first instance, this framing comparison would seem to be a gross one and not likely to catch small changes or phase shifts in framing (e.g., those on the order of several bit positions). However, because of the way data is stored and read out, in parallel, it will be evident that even a one bit displacement of the D9 framing bits will result in an error (E) signal. That is, if the D9 framing bits are displaced even one bit position they will appear, on read out, on an output rail other than the D9 output rail. The framing check will therefore be made against another bit, most likely a data bit, and as a result error (E) signals will be generated by the checker circuit 35.

Figure 7:
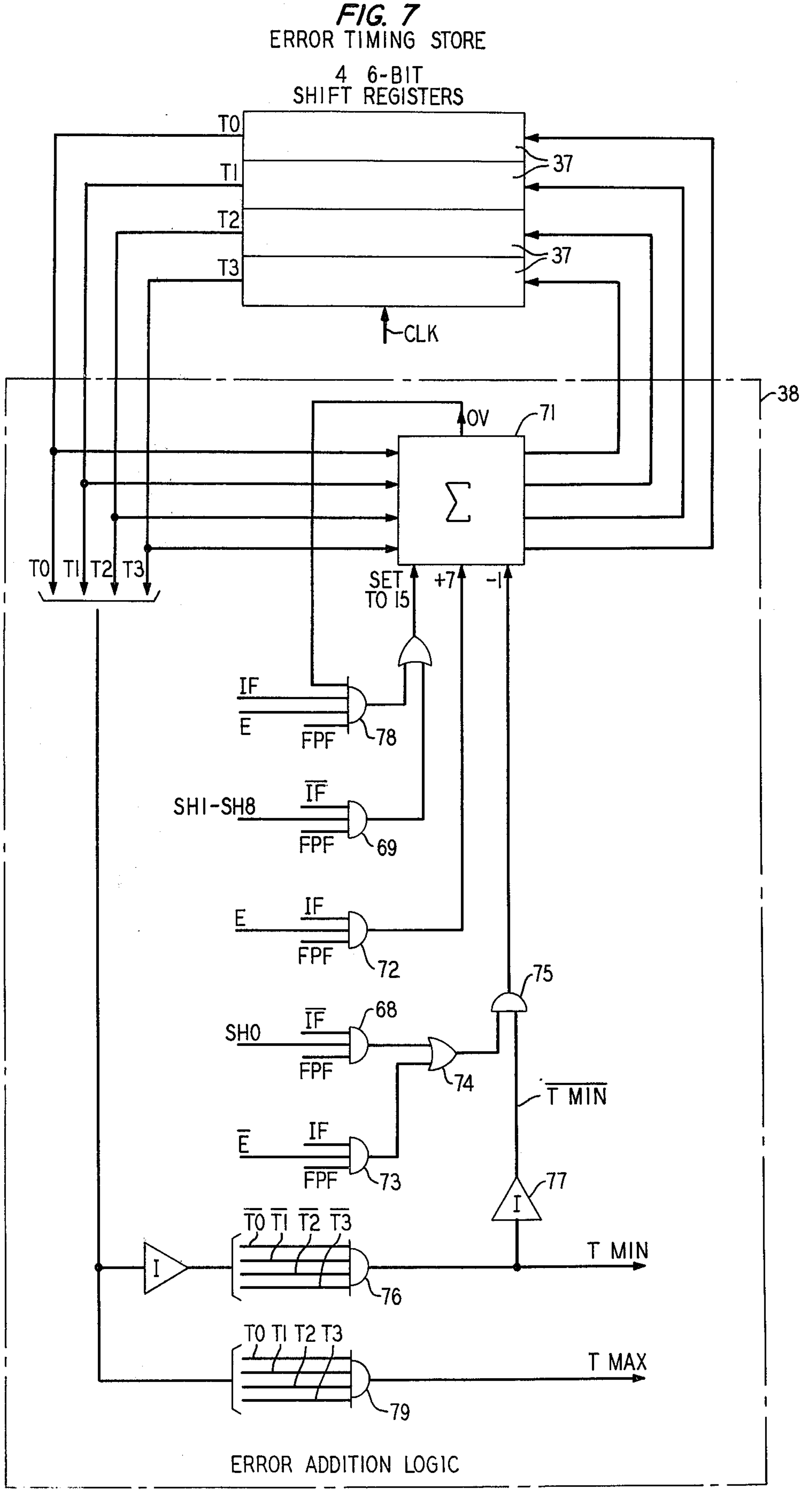
FIG. 7 is a detailed schematic diagram of the error timing store of FIG. 2.

The error (E) signals from the framing pattern checker 35 are delivered to the error timing store 36, shown in detail in FIG. 7 of the drawings. As disclosed herein, the error timing store 36 interacts closely with the reframer circuit of the invention and hence a detailed explanation of the operation of the error timing store appears necessary to provide a complete disclosure of the present invention. The error timing store consists of four 6-bit shift registers 37, a 4-bit binary adder 71 and combinational logic (i.e., the non-minimal AND-OR gate circuitry of FIG. 7). The registers 37 store the binary coded count from 0 to 15 for each of the five digroups and the test digroup. Four bits are, of course, required to register an error count of up to 15 and hence the need for four parallel shift registers. At any point in time, the corresponding cells of the registers 37 will temporarily store the error count for a given digroup. The registers 37 are shifted and loaded by clock (CLK) signals in exactly the same manner as the shift registers 33. Each of the cells of the registers 37 is also configured as shown in FIG. 6. To store the error count for all five incoming digroups and the test digroup, the registers 37 must be of 6-bit length. The binary adder 71 is used to increment and decrement the accumulated error count for each digroup. The combinational logic delivers signals to the binary adder 71 so as to add seven counts (+7) to, or substract one count (−1) from, the accumulated count for each digroup. Subtraction of one count is accomplished by the addition of the 2's complement of 0001 (or 1111). The binary adder 71 may also be set to the 1111 state by the overriding "set to 15" lead. Binary adders are well known in the art and hence no detailed description thereof is considered necessary. Moreover, it will also be evident to those in the art that the invention is in no way limited to the indicated count increment (+7) and count decrement (−1). Depending upon the received signal statistics, anticipated errors, etc., other and different count increments and/or decrements may be called for.

While a given digroup is in frame, the combinational AND-OR logic serves to increment or decrement the stored error count in reponse to error (E) signals provided by the framing pattern checker 35. The other input signals to the combinational logic comprise a framing pulse frame (FPF) indication, the in-frame (IF) or out-of-frame ($\overline{IF}$) signals derived from the in-frame status store 40, and SHIFT signals from the reframer 30, of FIG. 3. When a particular digroup is in frame (IF) and an error (E = 1) is recorded by the framing checker 35 during a framing pulse frame (FPF) for that digroup, the combinational logic adds seven counts (+7) to the state of the error timing store. This function is provided by the AND gate 72. If a particular digroup is in frame (IF) and no error ($\overline{E}$) is recorded by the framing pattern checker 35 during a framing pulse frame (FPF), one count (−1) is subtracted from the state of the error timing store unless the timing store is already in the all zeros (T MIN) condition. This (−1) decrement signal is provided by the AND gate 73 whose output is coupled via the OR gate 74 and the AND gate 75 to the binary adder 71. If the output of the shift registers 37 is in the all zeros condition (T0 = T1 = T2 = T3 = 0) the AND gate 76 is enabled to generate a T MIN signal. The T MIN signal is, therefore, indicative of the fact that the error count is 0 for the digroup. A (−1) decrement count at this point would cause a carry out of the least significant cell in the shift registers 37, which must be prevented. The inverter 77 is used to perform this function. If an all zeros condition exists (T MIN = 1) the output of inverter 77 serves to disable the AND gate 75 and thereby prevent a one count subtraction. The AND gate 75 is disabled when, and only when, the error count is 0 (T MIN = 1). If the addition of a +7 count to the error timing store causes a carry out of the most significant cell, an overflow (OV) signal is generated and the binary adder 71 is set to the 1111 state by means of the "set to 15" control signal. This "set to 15" signal is generated by the AND gate 78. When the error count of the timing store is in the all ones condition (1111) the AND gate 79 is enabled to generate the T MAX indication. The T MIN and T MAX signals are coupled to the in-frame status store 40.

When a particular digroup is out of frame ($\overline{IF}$) during a framing pulse frame (FPF) e.g., during a reframe operation, the error count of the error timing store 36 is incremented or decremented by SHIFT signals from the reframer 30. The SHIFT signals (SH1, SH2 . . . SH8) are indicative of the fact that the reframer is still "hunting" and the digroup is thus still out-of-frame; whereas the SHIFT signal SHO is indicative of the fact that framing may have been recaptured. The development of these SHIFT signals by the reframer circuit 30 and the significance of the same will be covered in detail hereinafter. Any of the SHIFT indications SH1-SH8 can be utilized with the appropriate combinational logic to generate a "set to 15" signal, while a SHO indication will decrement the error count by one (−1).

Accordingly, when a particular digroup is out of frame ($\overline{IF}$) during a framing pulse frame (FPF) and a SHO signal is generated by the reframer 30 (indicative of possible frame recapture), one count is subtracted from the state of the error timing store. This decrement signal is generated by the AND gate 68, which is coupled to the binary adder 71 via the OR gate 74 and the AND gate 75. The error count will, in this fashion, be continually decremented to zero, at which point the AND gate 75 is disabled in the manner described. However, if one of the SHIFT signals SH1–SH8 is generated by the reframer while the error count for the out-of-frame ($\overline{IF}$) digroup is in the process of being decremented to zero, the AND gate 69 is enabled so as to deliver a "set to 15" signal to the binary adder 71. During the subframes ($\overline{FPF}$), the state of the error timing stored is recirculated.

The error count of each digroup, including the test digroup, is clocked out of the registers 37 during the first, digroup time slot (e.g., TSO), revised by addition or subtraction as required in the binary adder 71, and then strobed or loaded into the input cells of the registers 37 during the last, digroup time slot (e.g., TS23).

The in-frame status store 40 records the in-frame (IF) or out-of-frame ($\overline{IF}$) status for each active digroup, as well as the test digroup. This record is stored in the 6-bit shift register 41, which is clocked (CLK) and configured in the same fashion as the previously described 6-bit shift registers 33 and 37. For an in-frame digroup a binary one bit is stored (IF = 1), while for an out-of-frame digroup a binary zero is stored ($\overline{IF}$ = 0). If a particular digroup is in-frame (IF), the stored digroup status remains in-frame until the error timing store 36 achieves the 1111 (T MAX) state, and at that time the stored status for the digroup is changed to $\overline{IF}$ by the logic circuit 42. If a digroup is out-of-frame ($\overline{IF}$), it remains in that state until the reframer has located the correct framing bit and has counted 15 consecutive framing bits without a pattern violation. This, of course, results in an error timing store count of 0000 (T MIN), which causes the stored status of the digroup to be changed to IF, by means of the status change logic 42. During the subframes ($\overline{FPF}$) of a digroup, the status for the digroup is recirculated.

The common control, variable shift, reframe circuit of the invention is shown in block form in FIG. 3 of the drawings, and in detailed schematic diagrams of FIGS. 8–14. Turning first to FIG. 3, the reframer 30 continually monitors, at the multiplex point, all of the digital groups and it serves to carry out a reframing operation, in the same time frame, for any and all of the time division multiplexed digital groups which are out-of-frame. The old data store consists of a memory 43, that is comprised of eight 6-bit shift registers, and combinational logic 44 which is "hard-wire" connected to the D1–D9 leads of the common bus 28 (it will be recalled that the data read out from the A and B stores of FIG. 1 is in a parallel format). The auxiliary data store 47 and the reframe comparator 48 are also connected to respective leads of common bus 28, for the purposes to be described hereinafter. The old data store is used to store a given number (8) of selected data bits (e.g., bits D2–D9 of TS23), of each digroup, for two frames for framing comparison purposes. The old data store logic 44 serves to shift the stored data in response to SHIFT signals generated by the shift decoder 49 during a reframe operation and it further serves to update the stored data in response to INH, INV and REC signals developed by the reframer slip compensation circuit 52. The reframe comparator 48 serves to compare, for each digroup, the output of the old data store ($\phi$2–$\phi$9) with new data (D2–D9) that is two frames later in time. The results of the data bit comparisons (i.e., bits C2–C9) are coupled to the suitability store logic 46 and to the shift decoder 49. The suitability store consists of a memory 45, that is comprised of seven 6-bit shift registers, and combinational logic 46 and it is used to record, for each digroup, which of the compared data bits have had framing pattern violations and which remain as suitable candidates for the framing bit. The suitability store in effect records the results of the present set of comparisons (i.e., C2–C9) as well as the previous ones. As with the old data store, the data stored in the suitability store is shifted in position, and in a manner to be described, in response to SHIFT signals generated by the shift decoder 49 during a reframe operation. The shift decoder 49 determines how many data bit shifts, if any, should be made by the reframer, based on the present set of comparisons (C2–C9) and past suitabilities (S2–S8), in order to move to the next candidate for the framing bit. Once the number of shifts has been determined, the old data store, the suitability store and the write address logic for the out-of-frame digroup are shifted by the determined number of digits in preparation for the next set of data bit comparisons. The described operation is an intermittently continued one and the comparison and shifting operations are successively repeated until the framing bit is recaptured. The auxiliary data store 47 consists of seven memory cells which respectively store the D2–D8 bits of the previous time slot (e.g., TS22) for possible shifting of the same into the old data store. The shift address decoder 51 serves to convert the number of shifts into a binary code, and it further serves to enable the reframe shift logic 31 of one, and only one, digroup at any given time. Thus, the shift address decoder 51 generates the appropriate shift address signal and delivers the same to the appropriate digroup receive logic circuit. As the name implies, the slip compensation circuit 52 serves to compensate the reframer for the effects of slip. The compensation circuit generates recirculate (REC), inhibit (INH), and invert (INV) signals which are used by the old data store logic 44 to update the stored data; the INH signal is also coupled to the suitability store logic 46 and to the shift address decoder 51 for the purposes to be described hereinafter.

Turning now to the detailed schematic diagrams of FIGS. 8 through 14, the first number or first pair of numbers of a reference numeral will indicate the FIG. in which the referenced component can be found. While a given digroup is in frame, the assumed framing bit D9 and the data bits D2–D8 of channel 23 for that digroup are stored in the old data store memory 43, of FIGS. 3 and 8. To store the D2–D9 bits, eight parallel shift registers are required with each, here again, of a 6-bit length. At any point in time, the corresponding cells of the shift registers will temporarily store eight bits of a given digroup. The eight 6-bit shift registers of the old data store are clocked and configured in the same fashion as the previously described 6-bit shift registers. Thus, the stored data bits of each digroup, including the test digroup, are clocked out of the eight shift registers 43 during the first, digroup time slot (e.g., TSO), shifted in position or updated as required in the old data store logic 44, and then strobed or loaded into the input cells of the shift registers during the last, digroup time slot (e.g., TS23).

For simplicity, the operation of the reframe circuit will be described initially with the effects of slip ignored completely; then the effects of slip will be introduced. For the initially assumed in-frame condition of a digroup, the D2–D9 bits of time slot TS23 for that digroup are loaded into the old data store memory 43 via the AND gates 801, of FIG. 8. As will be described hereinafter, for an in-frame digroup the SHIFT signal SHO = 1, and the gates 801 are thereby enabled to deliver the D2–D9 bits to the eight shift registers 43-2 through 43-9 via the OR gates 802. the AND gates 803 and OR gates 804. For the initially assumed condition of no slip, the slip compensation signals INH and INV are zero. Since slip is a relatively infrequent occurrence, the normal condition is $\overline{INH} = \overline{INV} = 1$. With no slip, therefore, the AND gates 803 are enabled during each framing pulse frame (FPF = 1) so as to respectively couple the D2–D9 bits to the eight shift registers, which are then loaded during the last, digroup time slot (TS23).

Figure 12:
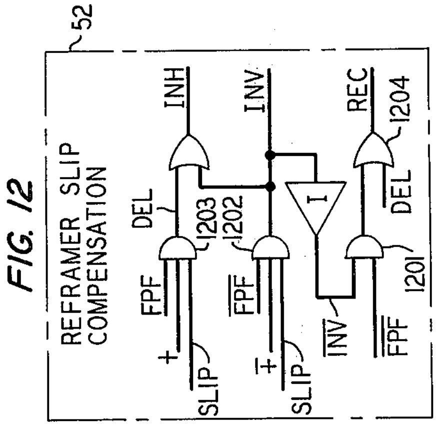
FIG. 12 is a schematic diagram of the reframer slip compensation circuit of FIG. 3.
Figure 10:
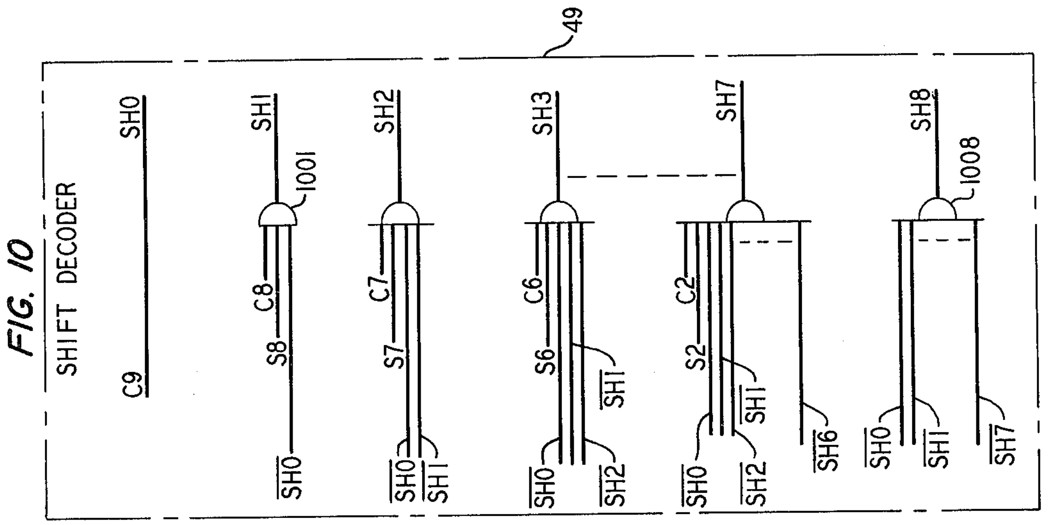
FIG. 10 is a detailed schematic diagram of the shift decoder of FIG. 3.
Figure 16A:
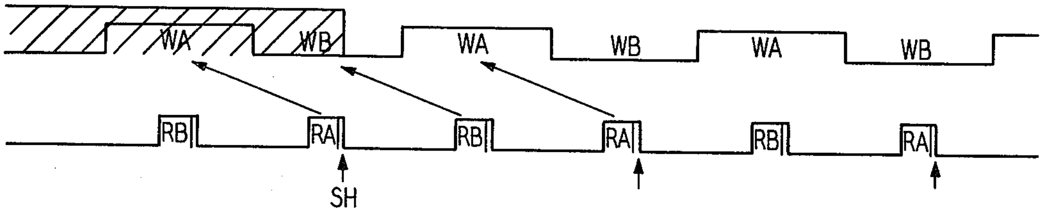
FIGS. 16*a*–16*e* show waveforms which illustrate the effect of shifting the write address for the receive data stores of a digital group that is out-of-frame.
Figure 16B:
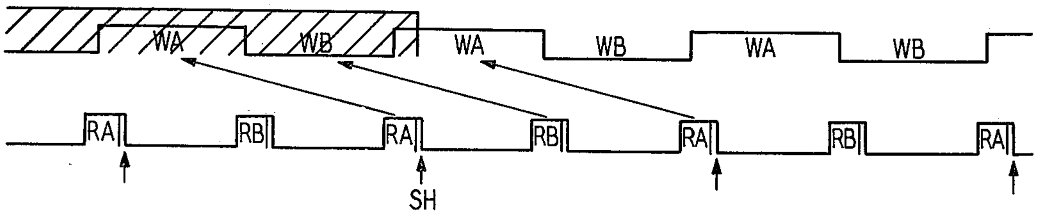
Figure 16C:
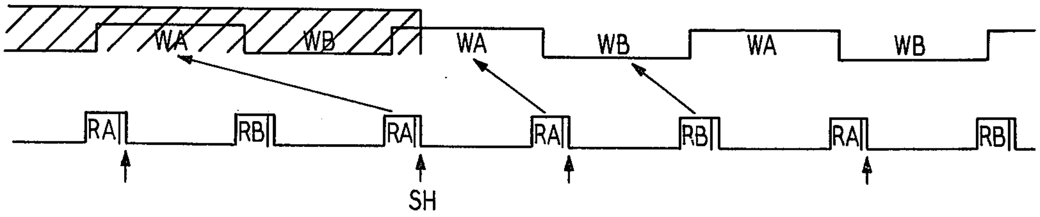
Figure 16D:
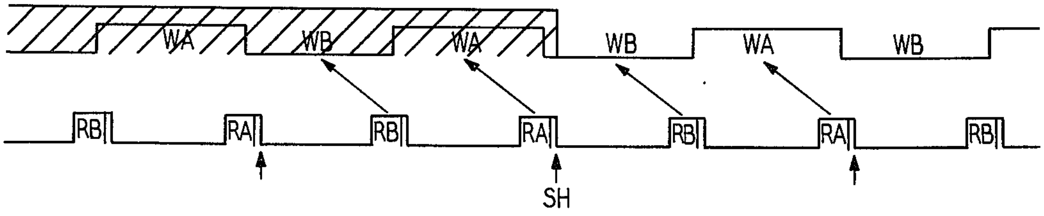
Figure 16E:
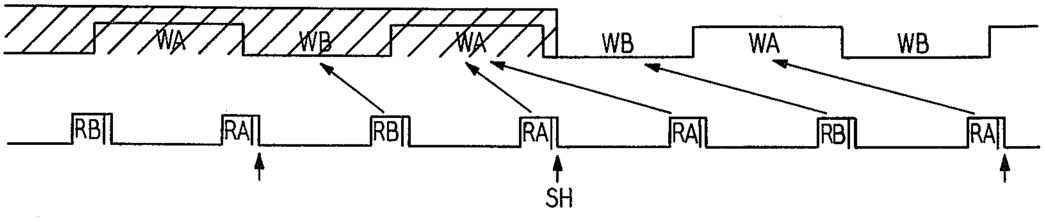

The bits stored in the old data store memory 43 are recirculated (REC) during the signaling subframes (FPF = 0) by AND gates 805. Turning for the moment to FIG. 12, with no slip ($\overline{INV}$ = 1), an REC = 1 signal is generated during the subframes ($\overline{FPF}$ = 1) by means of the AND gate 1201. This recirculate (REC) signal enables the AND gates 805, and the output of the old data store ($\phi$2–$\phi$9) is thereby coupled back to the input cells of the same via gates 805 and 804. Also, while a digroup is in frame, 1's are loaded into the suitability store to initialize all bits D2–D8 as suitable candidates for the true framing bit, should the digroup go out-of-frame. This initialization is initiated by the in-frame (IF) signal that is applied to the OR gates 901 of the suitability store logic of FIG. 9. As with the previous shift registers, the seven shift registers 45-2 through 45-8 of the suitability store memory 45 are loaded during the last digroup time slot (TS23). The seven 6-bit shift registers, used to store the suitability data bits for each digroup, are clocked and configurated in the same manner as the previously described 6-bit shift registers.

When a digroup goes out-of-frame, the reframing circuit continues to look for the framing bit during the (same) framing pulse frames (FPF). In the absence of slip during reframing, the FPF signal remains unchanged: i.e., FPF 1 every other frame. However, the reframing operation introduces changes into the write address cycle in a manner to be described, and this can induce a slip which changes, by one frame, the time occurrence of the FPF pulse, according to the previous discussion. The frame detector 20 of FIG. 2 controls the generation of the FPF signal, and the slip compensation circuit of FIG. 12 compensates the reframer to the effects of slip. As previously indicated, the following description will initially assume a no slip condition; then the effects of slip will be introduced.

During reframing (IF=0, $\overline{IF}$=1), several processes are in progress simultaneously when FPF=1. The stored old data $\phi9$ and $\phi2$–$\phi8$ is compared with new data D9 and D2–D8 by pairwise exclusive-OR operations. The results of previous comparisons are available in the form of suitability signals S2–S8 from the suitability store. Based on this present and past information, the shift decoder determines the number of shifts which should be made by the reframe circuit to proceed to the next candidate for the framing bit. The comparison of the stored old data $\phi9$ and $\phi2$–$\phi8$ with new data D9 and D2–D8 is carried out by the reframe comparator of FIG. 11 which is comprised of eight exclusive-OR gates 1101. In effect, the reframe comparator logic serves to compare the D2–D9 bits currently on the bus 28 with the corresponding bits that occurred two frames earlier in time. During reframing, if D9 differs from $\phi9$, a valid framing pattern then persists (it will be recalled that the framing pattern is 10101 . . . ) and C9=1; also, an SHO signal is generated (C9=SHO, FIG. 10). Under this condition, no shifts are made by the reframe circuit, the new D9 and D2–D8 data bits are loaded into the old data store via the AND gates 801, and the new suitabilities $\hat{S}2$–$\hat{S}8$ are determined from the old suitabilities S2–S8 and comparisons C2–C8 and are loaded into the suitability store memory 45. Also, the error timing store 36 of FIG. 2 is decremented by one count to record the successful comparison. It should be noted that although a reframe operation for a digroup is initiated by the seeming out-of-frame condition of the digroup, a valid framing comparison (C9=1) between the D9 and $\phi9$ bits can still occur. This may be simply fortuitous or, in fact, framing may never actually have been lost but merely appeared to be so due to noise bursts or other anomalies.

Figure 9:
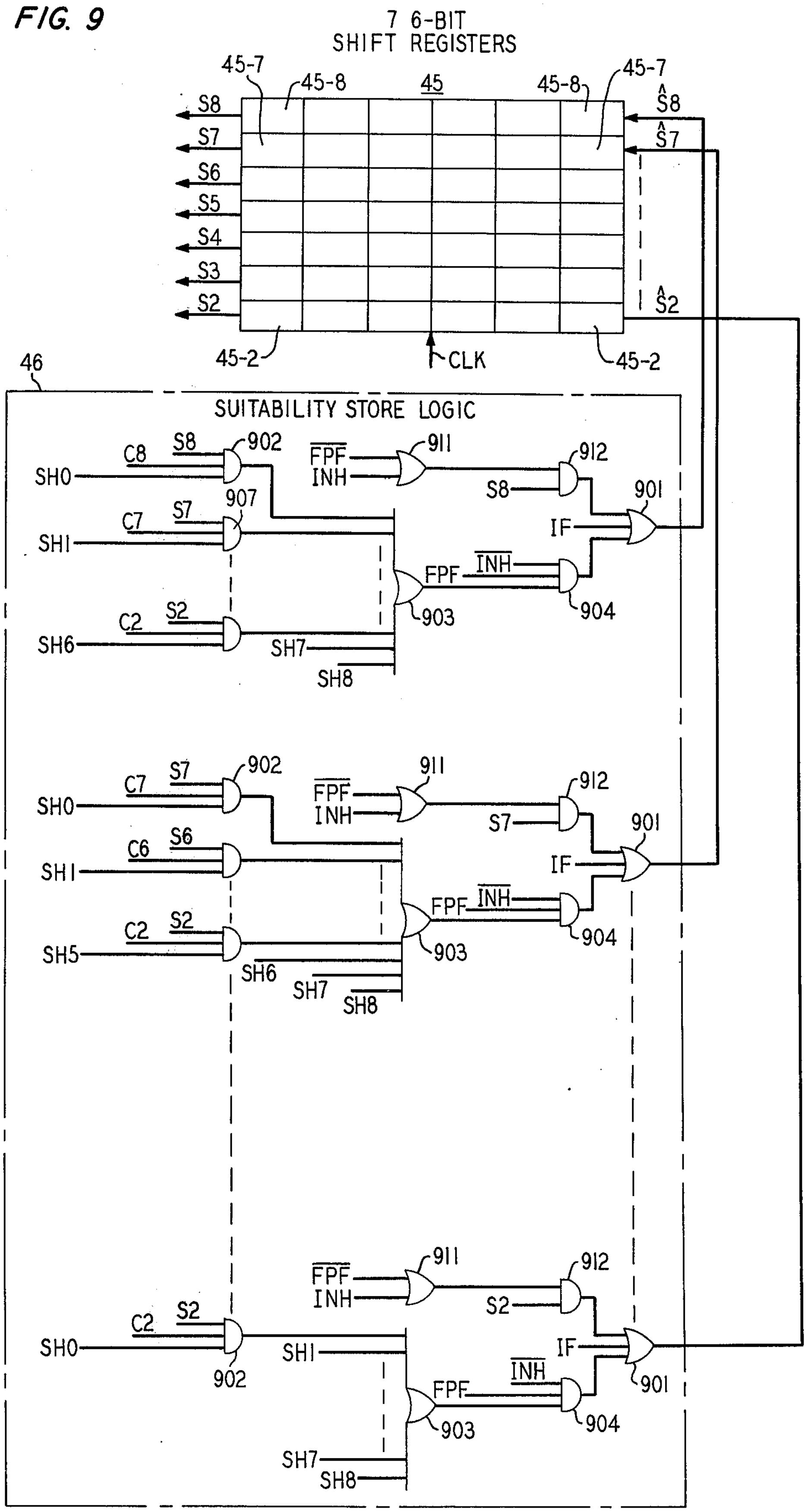
FIG. 9 is a schematic diagram of the suitability store circuit of FIG. 3.

The suitability data stored in the suitability store records, for each digroup, which of the compared data bits (D2–D8) have had framing pattern violations and which remain as suitable candidates for the framing bit. In addition to the D9/$\phi9$ bit comparison, the stored old data bits $\phi2$–$\phi8$ are compared with the new data bits D2–D8 in the exclusive-OR gates 1101 of the reframe comparator of FIG. 11. If any of the data bits D2–D8 differ from $\phi2$–$\phi8$ in the present comparison and they were suitable for past comparisons they can be said to exhibit a valid framing pattern and thus remain as suitable candidates for the framing bit. The results of these comparisons are coupled to the suitability store logic 46 of FIG. 9 and more particularly to the AND gates 902. The S2–S8 bits are initialized to all 1's, as heretofore described, and for present purposes it is assumed that C9=1. Thus, with SHO=1 and S2 through S8=1, at least initially, each of the AND gates 902 will be respectively enabled if, but only if, its comparison signal input (i.e., C2, C3, . . . C8) is a binary one. For example, if D8 differs from $\phi8$, C8=1 and the new suitability bit $\hat{S}8$ will be a binary one. The AND gates 902 are coupled to the input cells of the seven shift registers 45 via the OR gates 901 and 903 and the AND gates 904, which are enabled during each framing pulse frame (FPF). If any of the new data bits D2–D8 are the same as $\phi2$–$\phi8$, a framing pattern violation is indicated and the comparison bit(s) $C_j$=0. Under this condition the stored suitability bit(s) will be changed to a binary zero. For example, if D8 is the same as $\phi8$, C8=0 and the top-most AND gate 902, in FIG. 9, is thus disabled so as to change the new suitability bit $\hat{S}8$ to a binary zero. If a suitability bit $S_j$ is set to binary zero, a later valid framing comparison ($C_j$=1) is unavailing, since each of the AND gates 902 also requires a binary one suitability bit $S_j$ in order to be enabled. Thus, when one or more of the suitability bits are set to 0 they remain in that state irrespective of later seemingly valid frame comparisons.

During reframing, if the D9 bit and the $\phi9$ bit are the same, C9 = 0, a framing pattern violation is indicated, and a shift of from one to eight bits will be made by the reframe circuit. The number of shifts to be made is determined by the shift decoder of FIG. 10. With C9 = 0, SHO = 0 and $\overline{SHO}$ = 1. Now if D8 is suitable (i.e., S8 = 1) and if the present comparison is favorable (C8 = 1), then a shift of one is indicated (SH1 = 1) by the enablement of AND gate 1001. If a shift of one is not indicated ($\overline{SH1}$=$\overline{SHO}$=1) and D7 is suitable (S7=1) and C7 = 1, a shift of two is indicated (SH2 = 1); and so on. If $\overline{SHO}$ through $\overline{SH7}$ = 1, a shift of eight is indicated by the enabling of AND gate 1008; this is the maximum number of shifts than can be made at one time. The SHIFT signals SH1–SH8 are of consequence only during reframing; for example, should one of the signals SH1–SH8 be generated fortuitously by the shift decoder 49 while a digroup is in-frame the same is effectively ignored by the operation of the shift address decoder 51, to be covered hereinafter.

Once the number of shifts has been determined for a digroup, the old data store, the suitability store, and the write address 14 for the data stores A and B for the digroup must be shifted by this number of digits in preparation for the next FPF=1 interval. Also, the error timing store 36 is initialized to its maximum count. The data in the old data store is shifted by means of its combinational logci 44. Instead of loading $D_j$ into location $j$, the combinational logic loads $D_j$ into location $j + t$, where $t$ is the number of digits of shift. For example, if the SHIFT signal SH1 is generated by the shift decoder 49, the D8 bit is loaded via AND gate 811 into the shift register 43-9 instead of shift register 43-8, and each of the other data bits D2–D7 are similarly shifted or moved up one shift register position. Concurrently therewith, the D1 bit of channel 23 of the digroup is loaded into the shift register 43-2 by means of the AND gate 812. Alternatively, if the SHIFT signal SH2 is generated, the data bits are shifted or moved up two register positions (e.g., D7 from register 43-7 to register 43-9); and so on.

Because up to eight new digits may be loaded into the old data store by the shift operation, D1 of channel 23 and $\hat{D}2$–$\hat{D}8$ of channel 22 for that digroup must be available. During the last time slot (TS23) in the read cycle, D1 appears on the multiplex bus 28 and $\hat{D}2$–$\hat{D}8$ are available from the auxiliary data store 47, which is essentially a one time slot delay strobed by the office clock. The auxiliary data store 47 consists of seven memory cells, configured as shown in FIG. 6, which respectively store the D2–D8 data bits of the previous time slots TS22. The data bits are loaded into the input flip-flops of the memory cells during time slot TS22 and then shifted to the output flip-flops at the beginning of time slot TS23. Thus, the TS22 data bits ($\hat{D}2$–$\hat{D}8$) have been effectively delayed one time slot and are available for possible loading into the old data store during TS23. Should the SHIFT signal SH8 be generated by the shift decoder 49, the D1 bit of time slot TS23 will be loaded into the shift register 43-9 via the enabled AND gate 813, the $\hat{D}8$ bit of time slot 22 will be loaded into shift register 43-8 by means of the AND gate 814 . . . and the $\hat{D}2$ bit of TS22 will be shifted into shift register 43-2 by means of the enabled AND gate 815.

In a manner analogous to the above described shift operation, the suitabilities are shifted by means of the combinational logic 46 associated with the suitability store memory 45. Thus, instead of loading the newly computed suitability bit $\hat{S}_j$ into location $j$, the combinational logic loads it into location $j + t$, where $t$ is the number of digits of shift. For example, if the shift signal SH1 is generated by the shift decoder 49, the newly computed suitability bit $\hat{S}7$ is loaded via AND gate 907 into the shift register 45-8 instead of shift register 45-7, and each of the other suitability bits $\hat{S}2$–$\hat{S}6$ are similarly shifted or moved up one shift register position. If the SHIFT signal SH2 is generated, the suitability bits are shifted or moved up two register positions; and so on. The new data (D1 and $\hat{D}2$–$\hat{D}8$) which has just been shifted into the old data store is made initially suitable in store 45 by loading a 1 into the corresponding suitability store location. For example, the signal SH1 loads the D1 bit of channel 23 into the old data store, shift register 43-2; a 1 must therefore be loaded into the corresponding suitability store register 45-2. This is accomplished by coupling the SH1 = 1 bit to the lowermost OR gate 903 of FIG. 9. For the SHIFT signals SH7 or SH8, 1's are loaded into each of the suitability shift registers by delivering the SH7 or SH8 signals to the input of each of the OR gates 903. The write address for the data stores of the out-of-frame digroup is shifted by means of the shift address decoder 51, in the manner to be described in detail hereinafter.

For any FPF = 1 interval, the "head" bit in the shift register 43-9 of the old data store is tentatively assumed to be a valid framing bit. If this bit position satisfies the alternating framing pattern for 15 frames, the error timing store 36 counts down to T MIN and the in-frame status store 40 of FIG. 2 registers an in-frame condition (IF = 1), signaling the end of the reframing procedure. Whereas, if the head bit does not satisfy the alternating framing pattern, a SHIFT signal is generated so as to shift the next likely looking framing bit into the head bit position. The above described operation is a continuous one and the comparison and shifting operations are repeated until the true framing bit appears in the head bit position (i.e., shift register 43-9) in the old data store 43.

Figure 14:
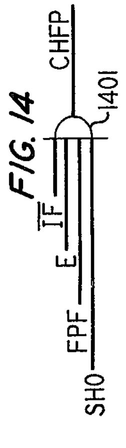
FIG. 14 shows the logic circuit for developing the CHFP signal utilized by the framing detector of FIG. 2.
Figure 11:
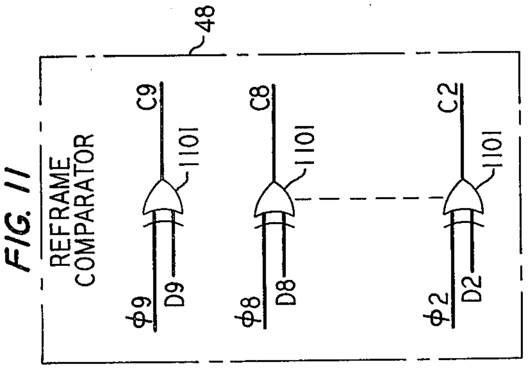
FIG. 11 is a schematic diagram of the reframe comparator of FIG. 3.

During reframing ($\overline{IF}$ = 1), a SHIFT signal SH0 is generated whenever D9 differs from $\phi 9$, this being indicative, at least tentatively, of a valid framing pattern. If an error signal (E) is generated at this time by the framing pattern checker 35, it indicates that the alternating pattern of the D9 bits is then out-of-phase with the locally generated waveform used by this digroup. In this case, the AND gate 1401 of FIG. 14 is enabled to generate a CHFP signal which changes the framing pattern state stored in the status store 32, as previously described. Thus, when the in-frame condition for a digroup is finally realized, the framing pattern state variable is correct for the framing bit which has been found.

To compensate for the effects of slip, the framing pattern status store 32 of FIG. 2 undergoes transitions among its states, as previously described. The effect of these transitions of the reframe circuit is to change the location of the FPF signal to that of the next valid framing pulse frame after the slip. Under certain conditions of slip, however, further compensation is required. When a negative slip occurs with framing bits in the B store, a framing bit (D9) and a set of D2–D8 bits for channel 23 are lost completely. When this situation occurs, the reframe circuit must complement the contents of the old data store so that the stored data ($\phi 2$–$\phi 9$) will be correct for the next comparison. This is necessary because each of the successive framing bits is normally the complement of the preceding framing bit, but the negative slip will temporarily alter the complementary pattern of the successive framing bits. When a positive slip occurs with the framing bits in the A store, a redundant framing bit D9 and set of D2–D8 data bits are added to the multiplex bit stream. When this situation occurs, the reframe circuit compensates by deleting the redundant information from consideration. For all other conditions of slip, no further compensation is necessary.

Figure 8:
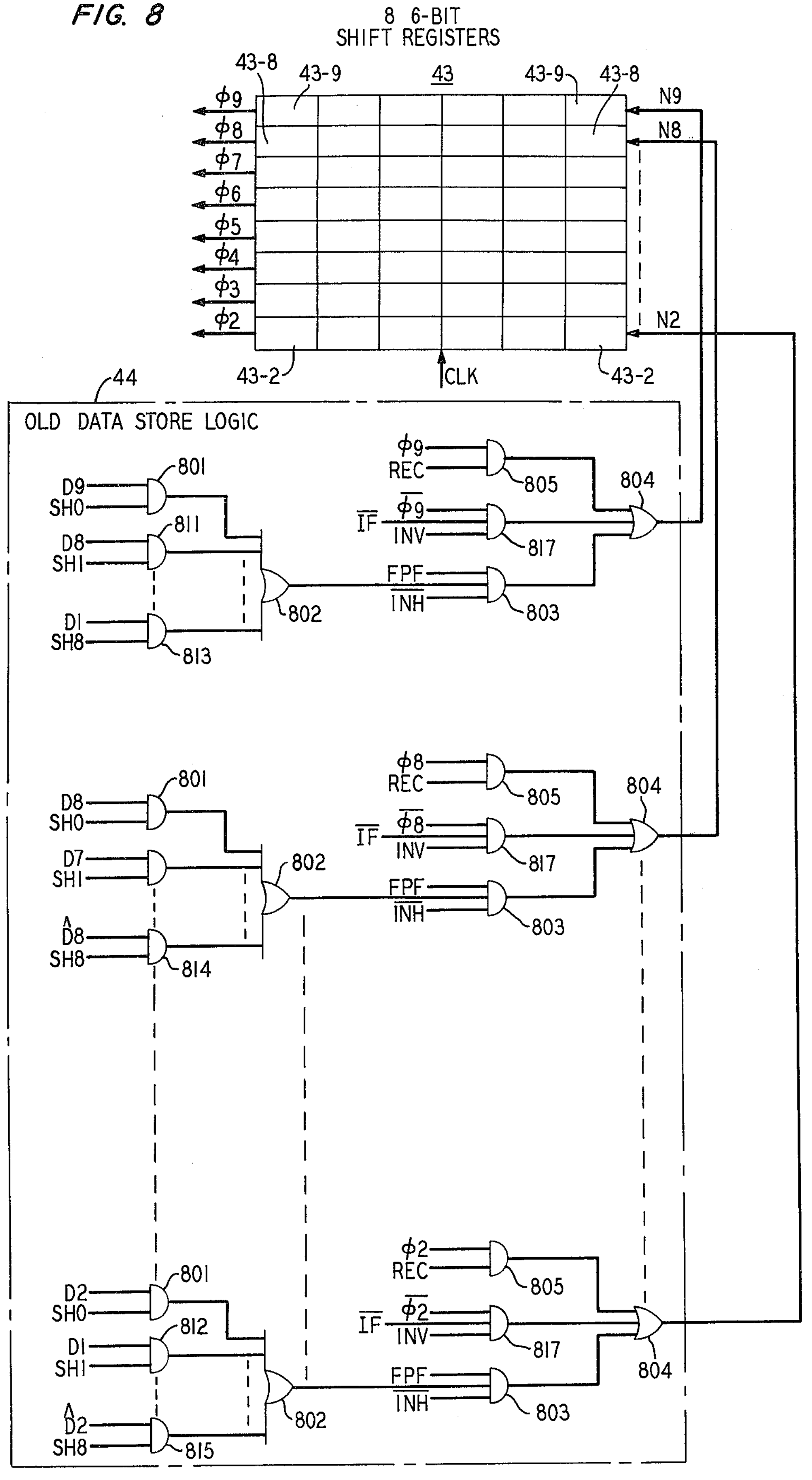
FIG. 8 is a schematic diagram of the old data store circuit of FIG. 3.

The circuitry which implements the added compensation, noted above, will now be described with reference to FIGS. 8, 9 and 12 of the drawings. If a negative slip ($\pm$ SLIP) occurs during an $\overline{FPF}$ = 1 interval, it indicates that the framing bits are in the B store, the framing bit D9 and data bits D2–D8 of channel 23 have therefore been lost, and the contents of the old data store must be complemented so as to compensate for this slip. For the above conditions, the AND gate 1202 of FIG. 12 is enabled to generate the INV = 1 signal. During reframing ($\overline{IF}$) and when INV = 1, the data $\overline{\phi 2}$–$\overline{\phi 9}$ is inverted ($\phi 2$–$\phi 9$) and then loaded into the old data store via the AND gates 817. If a positive slip (+SLIP) occurs during an FPF = 1 interval, it indicates that the framing bits are in the A store, a redundant framing bit (D9) and set of D2–D8 bits have been added in the multiplex bit stream, and the reframe circuit must compensate for the same by deleting the redundant information from consideration. For the above conditions, the AND gate 1203 is enabled to generate the DEL (delete) = 1 signal. This DEL signal is coupled to OR gate 1204 so as to produce the REC (recirculate) = 1 signal, which causes the true data to be recirculated in the old data store via AND gates 805.

Figure 13:
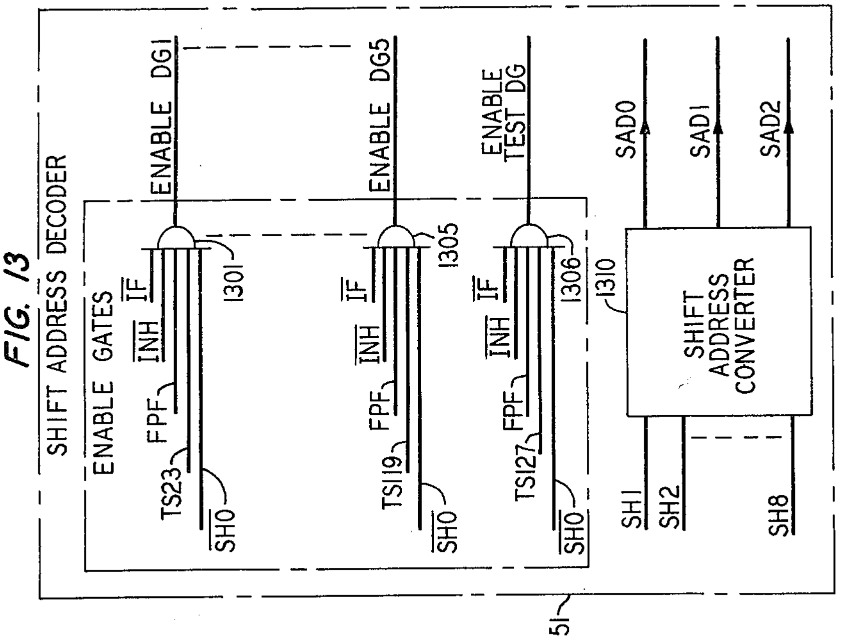
FIG. 13 is a schematic diagram of the shift address decoder of FIG. 3.

In FIG. 12, if INV = 1 or DEL = 1, then INH (inhibit) = 1; this results in a recirculation of the stored suitabilities and an inhibiting of the enable gates of the decoder 51 of FIG. 13. In FIG. 9, the INH = 1 signal is coupled via OR gates 911 to the AND gates 912 so as to enable the latter to recirculate the stored suitabilities S2–S8. At this time, $\overline{INH}$ = 0 and the AND gates 904 are thereby disabled. Thus, for either of the above discussed slip conditions, the suitability store is unaltered and the stored bits are simply recirculated. Also, with $\overline{INH}$ = 0 the enable gates 1301–1306 of the shift address decoder 51 are disabled. After a slip operation has been effected and the reframer compensated as described, the slip signal goes to zero and as a consequence DEL = INV = INH = 0.

The above-described compensation for the specified slip conditions are only required, and are only of consequence, during reframing. For the normal in-frame situation, the reframer is effectively disabled; while in-frame, IF = 1, $\overline{IF}$ = 0 and the enable gates 1301–1306 of decoder 51 are thus disabled. Also, with IF = 1, 1's are continually loaded into the suitability store via OR gate 901.

The write address for the receive data stores of the out-of-frame digroup(s) is shifted by means of the shift address decoder of FIG. 13. The decoder 51 comprises a shift address converter 1310, which codes the number of digits to be shifted into binary code, and enable gates 1301–1306, which select the digroup(s) to be shifted. For example, if the first of the multiplexed digroups (DG1) is out-of-frame ($\overline{IF}$) and a SHIFT signal SH1–SH8 has been generated by the reframer ($\overline{SHO}$ = 1), the *n* gate 1301 will be enabled during time slot TS23 of a framing pulse frame (FPF) unless the reframer is then being compensated for slip (INV = 1 or DEL = 1, and $\overline{INH}$ = 0). By way of further example, in the absence of slip ($\overline{INH}$ = 1) the write address of the out-of-frame ($\overline{IF}$ = 1) digroup five (DG5) will be shifted from 1 to 8 digits ($\overline{SHO}$ = 1) during time slot TS119 of a framing pulse frame (FPF =1); for the specified conditions the AND gate 1305 is of course enabled.

Shifting the write address for the receive data stores of a digroup which is out-of-frame advances the data such that the same time slot (e.g., the TS23 "window") may always be used for reframing. In effect, the data is moved past a stationary time slot or window during the hunting process, the direction of this motion being in the direction of decreasing channel numbers. The result of this shifting is a relative motion between the write and read cycles for the digroup. Since the write address is always advanced by the required number of shifts, the write cycles appear to move backward in time with respect to the stationary read cycles. The action of the reframe circuit, therefore, increases the apparent frequency of the write clock relative to the read clock, thus simulating the conditions for a negative slip. Whether the reframe process will introduce a slip depends on the initial alignment of the write and read cycles, the relationship between the recovered line frequency and the office frequency, the time required for reframing, and the number of shifts required to find the framing bit. If the reframer searches through the maximum number (385) of bits before locating the framing bit, up to two slips can be induced in the negative direction. Since the maximum number of shifts is eight digits, the shifting of the write cycle is reasonably gradual, and the slipping could be opposed or aided by the natural relationship between the line and office frequencies.

Rather than advancing the data, it will be apparent to those in the art that the shift signals could be used as inhibit signals to retard the write cycles. This would decrease the apparent frequency of the write clock relative to the read clock, thus simulating the conditions for a positive slip. As will be described herein, the write address is shifted by advancing the same for the required number of shifts. It is within the skill of one in the art, however, to provide a circuit which shifts the write address by retarding the same (i.e., inhibiting the count operation) the required number of shifts. Accordingly, it is to be understood that the invention is in no way limited to any specific means for shifting the write address in response to shift signals generated by the reframe apparatus of the invention.

Figure 15:
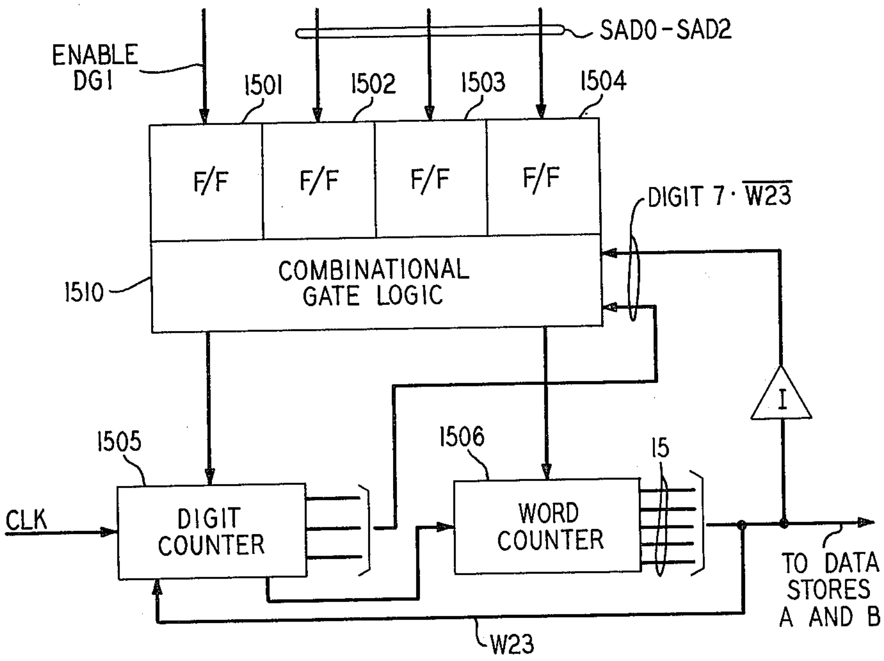
FIG. 15 is a schematic block diagram that illustrates the manner in which the write address for the receive data stores is shifted.

The shift address signals are coupled from the shift address decoder 51 of FIG. 3 to the reframe shift logic 31 of FIG. 1. The shift logic 31 is provided on a per digroup basis and, as shown in FIG. 15, it comprises four storage flip-flops 1501–1504. The "enabled digroup one" signal, for example, is stored in flip-flop 1501 and the binary codes shift address SAD0, SAD1, SAD2 (which may shift from one to eight bits) is stored in flip-flops 1502–1504. The write address circuit 14 comprises a digit counter 1505 and a word counter 1506. The clock pulses from the clock recovery circuit 12 are coupled to the input of the digit counter 1505. Counter 1505 normally counts from 0 to 7 and then recycles. The carry-out of the most significant cell of counter 1505 is coupled as a clock signal to the word counter 1506. Thus, the count in word counter 1506 is incremented for each cycle of the digit counter 1505. The word counter 1506 counts through 24 words (WO–W23) and then recycles. It is this count on the output leads 15 that is used to write the data words in the appropriate positions in the data stores. During the last word (W23) of the word counter cycle, a signal is coupled back to the digit counter 1505 to perturb the count cycle of the latter so that it counts from 0 to 8. Thus, the digit counter counts from 0 to 7 for 23 cycles and then from 0 to 8 for the 24th cycle (i.e., the W23 cycle).

Selected states of the digit and word counters are utilized to enable the gate logic 1510 to read the contents of the flip-flop stores 1501–1504 and set the counters 1505 and 1506 in accordance therewith. More particularly, the gate logic 1510 is enabled during the last count of the digit count cycle (digit 7) for all words except W23, the Boolean expression for this being: Digit 7 · $\overline{W23}$. During W23 the digit counter 1505 is perturbed by the feedback signal from the word counter 1506 and it is convenient not to perturb the counters at this time; hence, the $\overline{W23}$ input to the gate logic 1510. During the digit 7 count, the shift information stored in the flip-flops 1501–1504 is used to precondition the digit counter 1505 so that with the next input clock pulse the count is advanced an amount corresponding to the required digits of shift. For example, the stored SHIFT signal SH1 will precondition the digit counter so that the next input clock pulse will advance the count to digit 1 instead of digit 0, which would be the case in the absence of shift. The SH2 signal will precondition the digit counter, during the digit 7 count, so that the next input clock immediately advances the count to 2; and so on. The SH8 signal preconditions the word counter 1506 so tht it advances an extra count in response to the next input clock signal from counter 1505. An SH8 signal only modifies the count in the word counter and has no effect on the digit counter. After a shift operation has been effected, a digroup's enable flip-flop 1501 is cleared so as to inhibit, for the time being, any further advance of the write cycle. The write-in to the flip-flops 1502–1504 is destructive, i.e., a new SHIFT write-in destroys the previously stored SHIFT information.

FIG. 16 illustrates the effect of abruptly changing (i.e., shifting) the write address for the receive data stores of a digroup which is out-of-frame. In each case, during the WA portion of each write cycle waveform WA/WB, a frame of data is written into store A, and during the WB portion a frame is written into store B. The RA/RB waveforms correspond to the read cycle for the digroup. During the RA portion of each RA/RB waveform, a frame of data is read out of store A, and during the RB portion of the waveform store B is read. Also, in each case, the shift is indicated by the arrow and the associated symbol SH and, therefore, the cross hatched area indicates the time before the shift in address is made. The vertical arrows associated with each RA/RB waveform indicate the operative time slot or window of the reframer (e.g., TS23) and hence implicitly they also indicate framing pulse frames FPF. FIG. 16*a* shows a shift during a read A phase at a time when one receive store is being written while the other is being read. The arrows directed from the RA/RB waveform toward the WA/WB waveform relate the frame that is read out to the frame written in. From FIG. 16*a* it will be seen that the entire A store is written (WA) correctly between the FPF indications, so the next FPF interval following the shift will find the corrected information (i.e., the shifted data bits) in the proper location (i.e., W23 row) of the data store. FIGS. 16*b* and 16*c* illustrate the effect of shifts which occur just prior to and during a slip in the negative direction. In FIG. 16*b*, the last channel (i.e., W23) of the A store is written (WA) with the corrected information (i.e., the shifted data bits) between the FPF periods, so the corrected information is available for the FPF which follows the shift. In FIG. 16*c*, a negative slip occurs during an FPF interval and hence a frame of data in store B is discarded as indicated by the arrows directed from RA/RB to WA/WB. Since the last channel (i.e., W23) of the A store is written before TS23 of the next FPF = 1 interval, corrected information is available for the FPF pulse following the shift. FIGS. 16*d* and 16*e* show the effects of shifts occurring just prior to and during a slip in the positive direction. In FIG. 16*d*, the last channel of the A store is written just prior to TS23 of the FPF period which follows the shift, thereby insuring corrected data. In FIG. 16*e*, a positive slip occurs during an FPF period and a frame of data in store A is thus repeated. Because the reframe circuit deletes the next (redundant) FPF interval, channel 23 of the A store is written with the corrected (i.e., shifted) data before the next effective FPF interval, thereby insuring corrected data. In summary, the waveforms of FIG. 16 show, in each instance, that the last channel (i.e., W23) is written into store with the corrected information (i.e., the shifted data bits) at a point in time which precedes the read out and reframe processing of the same during the next FPF interval — i.e., during TS23 of FPF. And, this is so irrespective of the number of digits of shift or the occurrence of slip.

Figure 17:
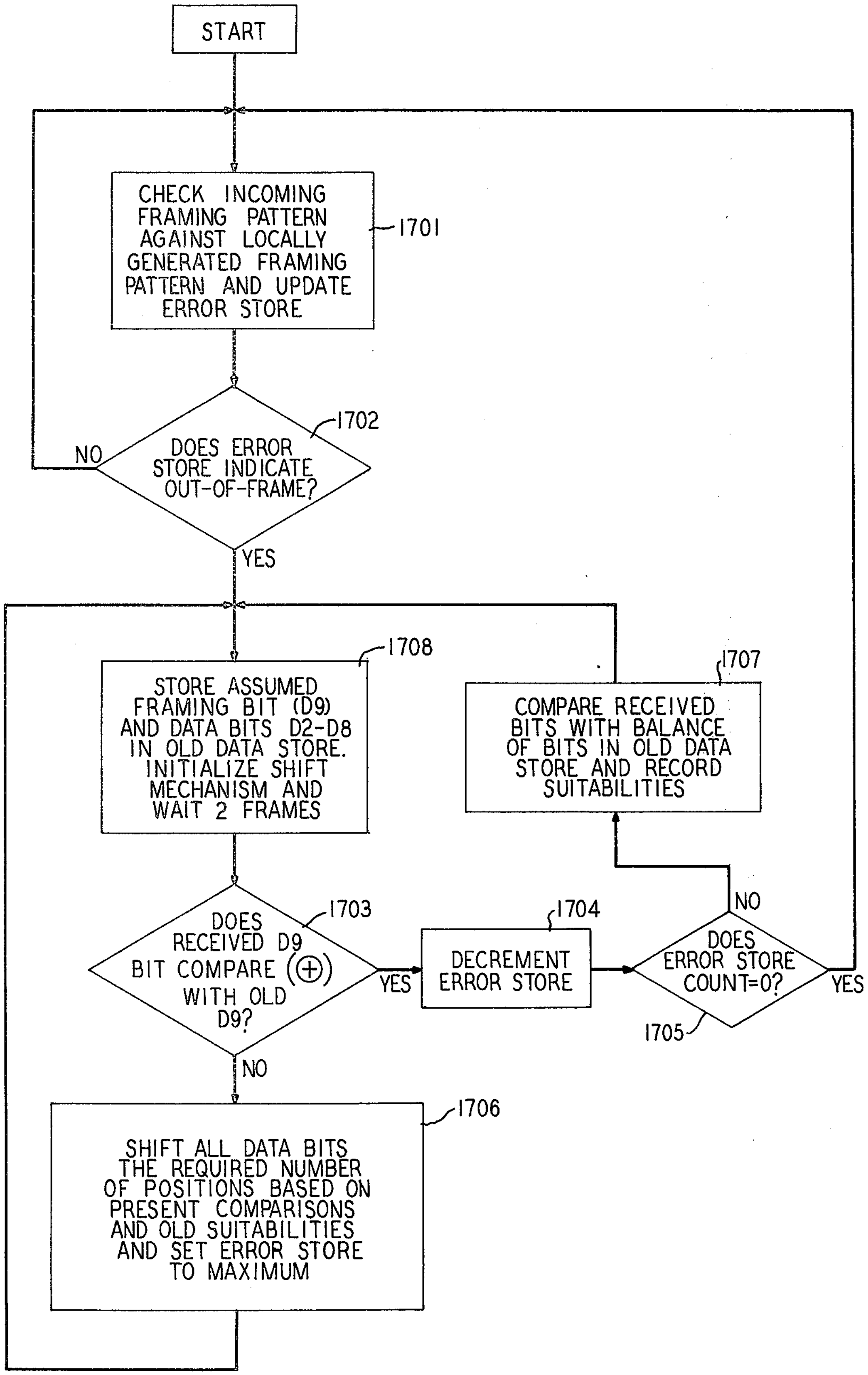
FIG. 17 is a flow chart which illustrates the reframe algorithm of the reframer circuit of the invention.

FIG. 17 is a flowchart that illustrates the reframe algorithm of the reframer circuit of the invention. The reframe algorithm illustrated in this figure relates to only a single entity (i.e., one digroup and it must be kept in mind, therefore, that the reframer carries out the same reframe operation for all of the digroups, concurrently in the same time frame. When the system is in-frame, the incoming framing bits (D9) are compared against a locally generated framing pattern (FP1), as shown in box 1701 of the flowchart. If the comparison is successful, the count in the error store is decremented or held at zero; if the comparison fails, the count in the error store is incremented. This comparison operation is performed by the framing pattern checker 35, and the count decrement and increment functions are carried out by the error addition logic 38. The comparison procedure continues until the count in the error store reaches a maximum (T MAX), at which time an out-of-frame condition is indicated ($\overline{IF}$) and a hunting procedure is initiated. As indicated in the flowchart, the in-frame processing continues so long as the error store does not indicate an out-of-frame condition; however, if the out-of-frame condition is indicated, the reframe procedure is initiated by the "yes" condition of the decision box 1702. During the hunting operation, the assumed framing bit and seven of the data bits (the assumed D2–D8 of channel 23) are loaded into the old data store 43 of FIG. 3. After two frames have passed, the newly received assumed framing bit is compared with the old one ($\phi 9$) in the comparator 48, as shown by the decision box 1703 on the flowchart. If the comparison is successful, the error store is decremented as shown by the box 1704. Also, the other bits in the old data store ($\phi 2$–$\phi 8$) are compared pairwise with their newly received counterparts (D2–D8) to record which of these bits is still suitable for the framing bit; this comparison is indicated by the box 1707, and the successful comparison loop is repeatedly retraced until the error store count = 0. When the assumed framing bit is suitably for a sufficient number of comparisons (15), the error store count reaches zero and the reframer is returned to the in-frame condition, as shown by the decision box 1705 of the flowchart. If a comparison on the assumed framing bit fails (decision box 1703) during the out-of-frame condition, the reframer shifts through the remainder of the stored bits to find the next bit which is still suitable, as indicated by box 1706. The reframer thus shifts to the next bit which is still suitable, and the loop is retraced to box 1708. If all bits prove unsuitable, eight new bits are loaded into the old data store and the process is repeated.

For this algorithm, data is transmitted through the terminal during the process of reframing. Framing is reestablished when the valid framing bit becomes the head bit in the reframer.

The system disclosed in FIGS. 1–3 is self-synchronizing. When a digroup is activated or placed on line its framing pattern may or may not match the framing pattern state in status store 32. The stored, framing pattern state will be in one of four random states and hence it is unlikely that the digroup framing pattern will match the same. Accordingly, the framing pattern checker 35 will immediately generate error (E) signals which will initiate a reframing action. The reframer 30 successively advances the counting operation of the write address circuit and in Alternatively, relatively short time (on average ≈ 25 msec.) an in-frame condition is realized and the framing pattern is brought into match with the stored, framing pattern state.

It is a particular advantage, realized in the cmmon control reframe circuit of the invention, that maintenance testing can be carried out with great facility. For example, a test vector (i.e., D1–D8 test data bits and a test D9 bit) can be inserted in the last time slot (TS 127) of the test digroup and the performance of the common control circuitry thereby monitored at selected points while in service operation. The test vector is inserted at the multiplex point by strobing, for example, the bits stored in a ROM (read only memory). The test bits can, of course, also be inserted under central processor control. It will be further evident that test bits can be provided to simulate + or ± slip, simulate an out-of-frame ($\overline{IF}$) condition in the test digroup, etc. The common control reframe circuitry is monitored at selected points (e.g., the $C_j$ output of the reframe comparator 48, the $S_j$ output of the shift decoder 49, the output of the shift address decoder 51, etc.) and failures can thus be quickly detected and isolated. And, importantly, these maintenance procedures can be continuously carried out with the equipment in normal service operation.

The stationary time slot or window past which the data is moved during reframing can, clearly, be altered in size to suit the needs of a particular application. This will, of course, necessitate additional shift registers for the old data store and the suitability store, as well as additional logic, if the size of the window is increased. Alternataively, fewer shift registers and less logic is required if the size of the window is decreased. If the window is increased, i.e., more data bits are examined at a time, a faster reframe time will be achieved, but at an increase in circuit complexity. If the window is decreased, the complexity of the circuitry is reduced, but at a sacrifice of reframe time. The disclosed circuitry represents, for the use intended, an advantageous compromise between circuit complexity and reframe time.

It should also be apparent from the foregoing description that the principles of the invention are equally applicable to a multiplexed bit stream that comprises a fewer or greater number of multiplexed digital groups. The only practical limitation on the number of digital groups that can be handled by the reframer of the invention is the bit rate of the digroups and the upper limit that exists on the speed of operation of the logic circuitry.

Accordingly, the above described arrangement is considered to be merely illustrative of the application of the principle of the present invention and numerous modifications thereof may be devised by those skilled in the art without departing from the spirit and scope of the invention.

What is claimed is:

1. In a time division switching system wherein a plurality of digital groups of time division multiplexed channels are time multiplexed together on to a common bus, each digital group including a similar predetermined framing-bit pattern; a reframer circuit comprising means for storing a given number of selected data bits including the assumed framing bit of each digital group and for cyclically reading the data bits of each digital group out of store in time coincidence with the appearance of each digital group on said common bus, comparator means serving to compare the output of said means with data bits of the same digital group that occur one or more frames later in time, suitability stoage means for recording for each digital group which of selected compared data bits have had framing pattern violations and which appear as suitable candidates for the framing bit, shift decoder means coupled to the output of said comparator means and said suitability storage means for determining how many digit shifts should be made based on the present set of comparisons and the past suitability record in said suitability storage means, means for shifting the data stored in the first recited means and for shifting the data recorded in said suitability storage means by a determined amount based on a digit shift indication from said shift decoder means, and means for shifting the multiplexed data bits of an out-of-frame digital group by a determined amount based on the digit shift indication from said shift decoder means.

2. A reframer circuit as defined in claim 1 wherein said shift decoder means repeatedly generates digit shift indications for an out-of-frame digital group until the true framing bit of the same occupies a predetermined position in the store of the first-recited means.

3. In a time division multiplex system wherein a plurality of digital groups of time division multiplexed channels are time multiplexed together on to a common transmission link, each digital group including a similar predetermined framing bit pattern; a common control, variable shift, reframe circuit comprising means including a shared recirculating memory for successively storing a given number of selected data bits including the assumed framing bit for each digital group for frame comparison purposes, comparator means serving to successively compare the data output of said shared recirculating memory with data bits of the same digital group which occur one or more frames later in time, suitability storage means including a shared recirculating memory for recording for each digital group which of selected data bits that have been compared have had framing pattern violations and which appear as suitable candidates for the framing bit, shift decoder means coupled to the output of said comparator means and said suitability storage means for determining how many digit shifts should be made by the reframe circuit based on the present set of comparisons and the past suitabilities recorded in said suitability storage means, means for shifting the data stored in the first recited means and for shifting the data recorded in said suitability storage means by a determined amount based on a digit shift indication from said shift decoder means, and means for digit shifting the multiplexed data bits of an out-of-frame digital group by a determined amount based on the digit shift indication from said shift decoder means.

4. A common control reframe circuit as defined in claim 3 wherein the shared recirculating memories comprise shift registers that are clocked in time coincidence with the appearance of the digital groups on the multiplexed transmission link.

5. A common control reframe circuit as defined in claim 4 wherein each of the shift registers comprises a number of cells that exceed by one the number of multiplexed digital groups.

6. A common control reframe circuit as defined in claim 3 wherein said shift decoder means repeatedly generates digit shift indications for an out-of-frame digital group until the true framing bit of the same occupies a predetermined position in the store of the first-recited means.

7. A common control reframe circuit as defined in claim 3 including means for compensating the reframe circuit for framing pattern changes introduced into each of the multiplexed digital groups during reframing and those introduced by the multiplex system for synchronization purposes.

8. A common control reframe circuit as defined in claim 3 wherein the framing bits are positioned in every other frame of each digital group and the first recited means stores the selected data bits of each digital group for two frames for frame comparison purposes, the comparator means thereby serving to compare for each digital group data bits which are two frames apart.

9. A common control reframe circuit as defined in claim 3 wherein the digit shift indication from said shift decoder means serves to shift one or more new data bits of an out-of-frame group into the memory of the first recited means, said new data bits being those juxtaposed to the selected data bits of the digital group previously stored in said first recited means, the number of new data bits inserted into memory corresponding to said digit shift indication.

10. A common control reframe circuit as defined in claim 9 wherein the digit shift indication from said shift decoder means serves to initialize said suitability storage means for said new data bits.

11. A common control reframe circuit as defined in claim 3 wherein five digital groups are multiplexed on to the common transmission link, said reframe circuit serving to maintain frame synchronization for each of said five digital groups and a test group concurrently in the same time frame.

12. A common control reframe circuit as defined in claim 3 wherein the storage of data bits in the first recited means, the data bit suitability recording in the suitability storage means and the digit shifting of the multiplexed data bits of an out-of-frame digital group all occur during the last time slot of each mutliplexed digital group.

13. A common control, variable shift, reframe circuit for maintaining frame synchronization, concurrently in the same time frame, for each of a plurality of digital groups which are time division multiplexed together on to a common bus, each digital group including a plurality of time multiplexed channels and a similar predetermined framing bit pattern, said reframe circuit comprising data store means including a shared recirculating memory for successively storing a given number of selected data bits including the assumed framing bit of each digital group for frame comparison purposes, said data bits of each digital group being read out of said shared recirculating memory in time coincidence with the appearance of each digital group on said common bus, comparator means serving to successively compare the data output of said shared recirculating memory with data bits of the same digital group which occur a predetermined number of frames later in time, suitability storage means including a shared recirculating memory for recording for each digital group which of selected data bits that have been compared have had framing pattern violations and which appear as suitable candidates for the framing bit, shift decoder means coupled to the output of said comparator means and said suitability storage means for determining how many digit shifts if any should be made by the reframe circuit based on the present set of comparisons and the past suitabilities recorded in said suitability storage means, means for shifting the data stored in said data store means and for shifting the data recorded in said suitability storage means by a determined amount based on a digit shift indication from said shift decoder means, means for digit shifting the multiplexed data bits of an out-of-frame digital group by a determined amount based on the digital shift indication from said shift decoder means, and means for compensating the reframe circuit for framing pattern changes introduced into each of the multiplexed digital groups by reframing as well as those introduced for synchronization purposes.

14. A common control reframe circuit as defined in claim 13 wherein the shared recirculating memories comprise shift registers that are clocked in time coincidence with the appearance of the digital groups on the multiplexed common bus.

15. A common control reframe circuit as defined in claim 14 wherein each of the shift registers comprises a number of cells that exceed by one the number of multiplexed digital groups.

16. In a time division switching machine wherein a plurality of incoming digital data groups are respectively stored a frame at a time and then read out from store in sequence such that the plurality of digital groups are time division multiplexed on to a common bus, each digital group including a plurality of time multiplexed channels and a similar framing bit pattern; a reframe circuit comprising data store means including a shared recirculating memory for successively storing a given number of selected data bits including the assumed framing bit of each digital group for frame comparison purposes, said data bits of each digital group being read out of said shared recirculating memory in time coincidence with the appearance of each digital group on said common bus, comparator means serving to successively compare the data output of said shared recirculating memory with data bits of the same digital group which occur an exact number of frames later in time, suitability storage means including a shared recirculating memory for recording for each digital group which of selected data bits that have been compared have had framing pattern violations and which appear as suitable candidates for the framing bit, shift decoder means coupled to the output of said comparator means and said suitability storage means for determining how many digit shifts if any should be made by the reframe circuit based on the present set of comparisons and the past suitabilities recorded in said suitability storage means, means for shifting the data stored in said data store means and for shifting the data recorded in said suitability storage means by a determined amount based on a digit shift indication from said shift decoder means, means for shifting the write address of the store of an out-of-frame digital group by a determined amount based on the digit shift indication from said shift decoder means, and means for compensating the reframe circuit for framing pattern changes introduced into each of the multiplexed digital groups by reframing and those introduced by the switching machine for synchronization purposes.

* * * * *

UNITED STATES PATENT AND TRADEMARK OFFICE

CERTIFICATE OF CORRECTION

PATENT NO. : 3,928,726

DATED : December 23, 1975

INVENTOR(S) : John R. Colton, Robert B. Heick and Henry Mann

It is certified that error appears in the above-identified patent and that said Letters Patent are hereby corrected as shown below:

Column 6, line 49, "cycled" should read --cycle--; line 60 "(+)" should read --($\bar{+}$)--. Column 7, line 63, "+" should read --$\bar{+}$--. Column 8, line 7, "group" should read --digroup--; line 24, "IF" should read --$\overline{IF}$--; line 31, "IF/IF" should read --IF/$\overline{IF}$--. Column 10, line 13, "stored" should read --store--. Column 14, line 66, "FPF1" should read --FPF = 1--. Column 18, line 4, "of" should read --on--; line 28, "(+ SLIP)" should read --($\bar{+}$ · SLIP)--; line 37, "ϕ2-ϕ9 is inverted (ϕ2-ϕ9)" should read --Ø2 - Ø9 is inverted ($\overline{Ø2}$ - $\overline{Ø9}$)--; line 38 "(+ SLIP)" should read --(+ · SLIP)--. Column 20, line 48, "tht" should read --that--. Column 22, line 19 "suitably" should read --suitable--; line 61, "+" should read --$\bar{+}$--. Column 23, claim 1, line 48 "stoage" should read --storage--. Column 25, claim 13, line 53, "digital" should read --digit--.

Signed and Sealed this

Nineteenth Day of October 1976

[SEAL]

*Attest:*

RUTH C. MASON
*Attesting Officer*

C. MARSHALL DANN
*Commissioner of Patents and Trademarks*